(12) United States Patent
Wenren

(10) Patent No.: US 11,435,554 B2
(45) Date of Patent: Sep. 6, 2022

(54) IMAGING LENS ASSEMBLY

(71) Applicant: ZHEJIANG SUNNY OPTICAL CO., LTD., Ningbo (CN)

(72) Inventor: Jianke Wenren, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 308 days.

(21) Appl. No.: 16/743,908

(22) Filed: Jan. 15, 2020

(65) Prior Publication Data

US 2020/0150383 A1 May 14, 2020

Related U.S. Application Data

(63) Continuation of application No. PCT/CN2018/095980, filed on Jul. 17, 2018.

(30) Foreign Application Priority Data

Oct. 24, 2017 (CN) .......................... 201711001644.2
Oct. 24, 2017 (CN) .......................... 201721377030.X

(51) Int. Cl.
*G02B 9/60* (2006.01)
*G02B 13/00* (2006.01)
*G02B 13/02* (2006.01)

(52) U.S. Cl.
CPC ............ *G02B 9/60* (2013.01); *G02B 13/0045* (2013.01); *G02B 13/02* (2013.01)

(58) Field of Classification Search
CPC ... G02B 9/60; G02B 9/62; G02B 9/64; G02B 13/0045; G02B 13/02

(Continued)

(56) References Cited

U.S. PATENT DOCUMENTS

2016/0238821 A1\* 8/2016 Liao .................... G02B 27/0025
2017/0102521 A1\* 4/2017 Son ......................... G02B 5/208
(Continued)

FOREIGN PATENT DOCUMENTS

CN 102269861 A 12/2011
CN 104898254 A 9/2015
(Continued)

OTHER PUBLICATIONS

International Search Report issued in corresponding International Application No. PCT/CN2018/095980 dated Oct. 23, 2018, pp. 1-4, State Intellectual Property Office of the P.R. China, Beijing, China.

*Primary Examiner* — Jordan M Schwartz
(74) *Attorney, Agent, or Firm* — Hauptman Ham, LLP

(57) ABSTRACT

The present disclosure discloses an imaging lens assembly including, sequentially from an object side to an image side along an optical axis, a first lens, a second lens, a third lens, a fourth lens and a fifth lens. The first lens has a positive refractive power, and both of an object-side surface and an image-side surface thereof are convex surfaces; the second lens has a negative refractive power, and both of an object-side surface and an image-side surface thereof are concave surfaces; the third lens has a positive refractive power, and an image-side surface thereof is a convex surface; the fourth lens has a negative refractive power, and an image-side surface thereof is a concave surface; and the fifth lens has a positive refractive power or a negative refractive power.

19 Claims, 14 Drawing Sheets

(58) Field of Classification Search
USPC .................................. 359/764, 766, 755–758
See application file for complete search history.

(56) References Cited

U.S. PATENT DOCUMENTS

| | | | |
|---|---|---|---|
| 2018/0081152 A1* | 3/2018 | Dai .................... | G02B 13/0045 |
| 2018/0284394 A1* | 10/2018 | Chen ...................... | G02B 13/18 |
| 2019/0196142 A1* | 6/2019 | Shi ..................... | G02B 13/0045 |
| 2019/0196152 A1* | 6/2019 | Shi ........................ | G02B 1/041 |

FOREIGN PATENT DOCUMENTS

| | | |
|---|---|---|
| CN | 104898256 A | 9/2015 |
| CN | 204613493 U | 9/2015 |
| CN | 105988186 A | 10/2016 |
| CN | 105988198 A | 10/2016 |
| CN | 106125255 A | 11/2016 |
| CN | 106199931 A | 12/2016 |
| JP | 5428240 B2 | 12/2013 |
| JP | 2014041388 A | 3/2014 |
| TW | 201106040 A1 | 2/2011 |
| TW | 201137430 A1 | 11/2011 |

* cited by examiner

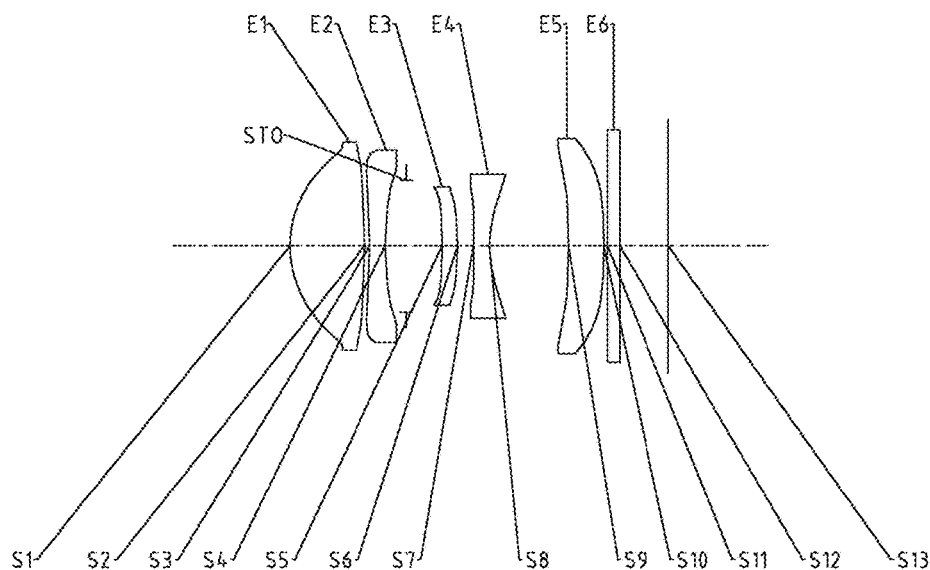
Fig. 5
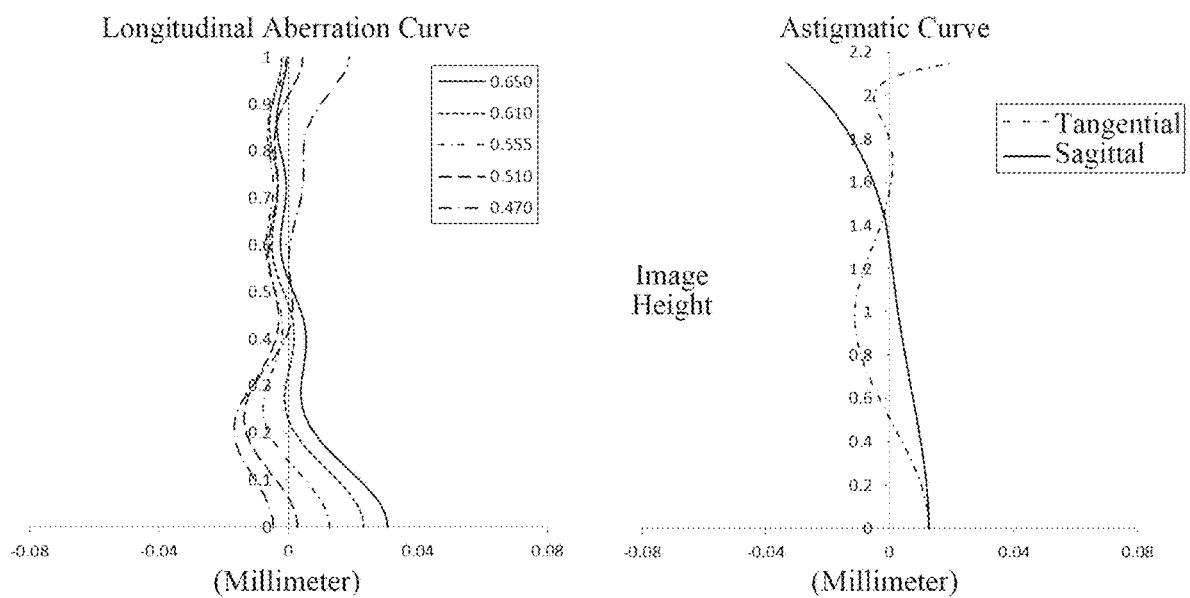
Fig. 6A
Fig. 6B

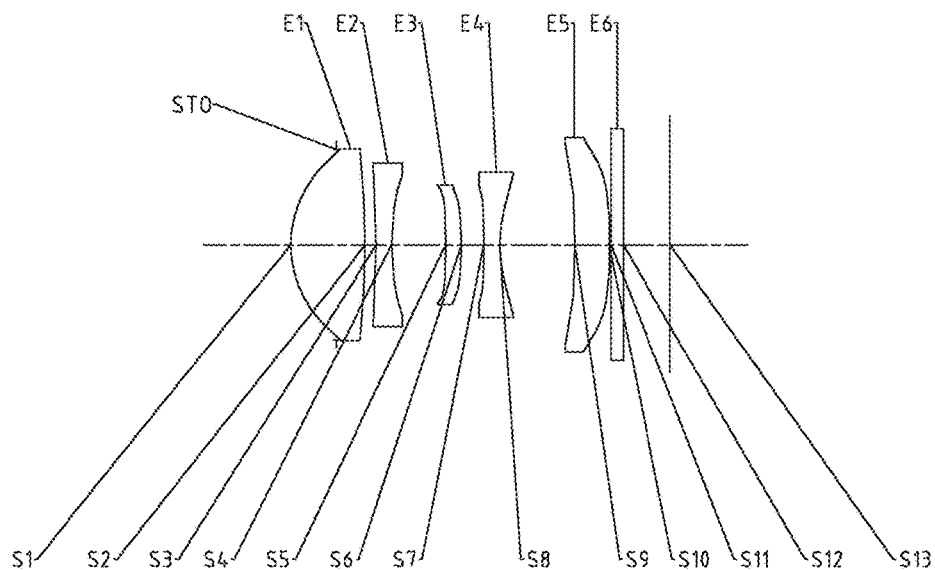
Fig. 13
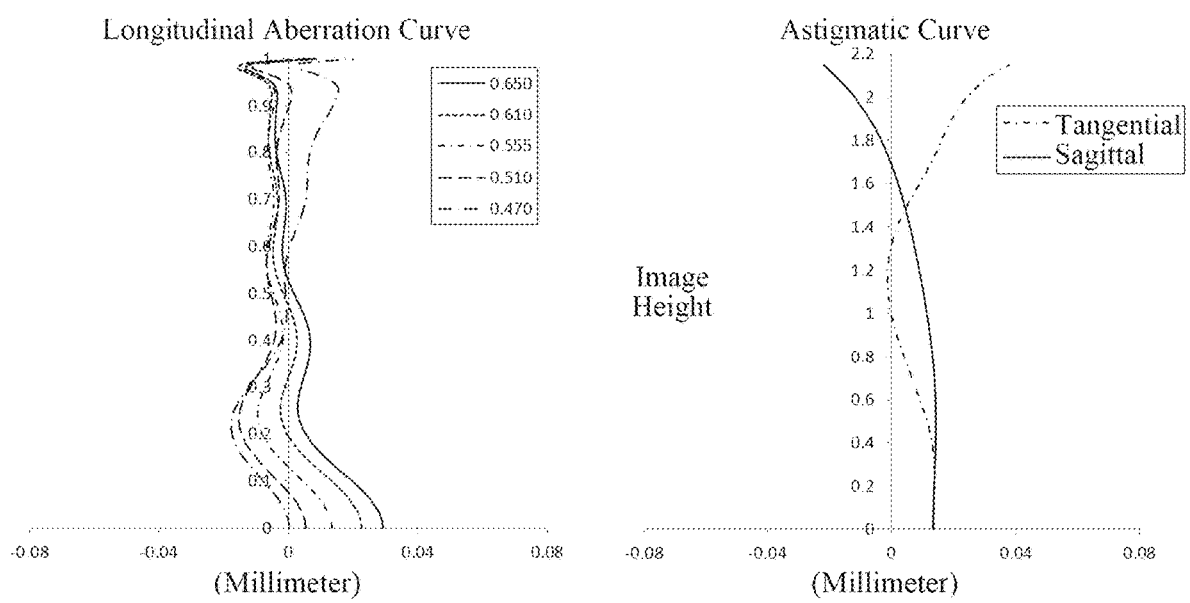
Fig. 14A
Fig. 14B

IMAGING LENS ASSEMBLY

CROSS-REFERENCE TO RELATED APPLICATIONS

The present patent application is a continuation of International Application No. PCT/CN2018/095980, filed on Jul. 17, 2018, which claims the priorities from Chinese Patent Application No. 201711001644.2, filed with the State Intellectual Property Office (SIPO) on Oct. 24, 2017, and Chinese Patent Application No. 201721377030.X, filed with the SIPO on Oct. 24, 2017. All of the aforementioned patent applications are hereby incorporated by reference in their entireties.

TECHNICAL FIELD

The present disclosure relates to an imaging lens assembly, and more specifically to an imaging lens assembly including five lenses.

BACKGROUND

In recent years, with the rapid replacement of portable electronic products such as mobile phones and tablet computers, the market requirements for imaging lens assembly for products are becoming more diverse. At this stage, the imaging lens assembly is not only required to have miniaturized features to be suitable for portable electronic products, but also required to have characteristics such as high pixel, high resolution, and long focal length to meet the imaging needs in various fields.

SUMMARY

The preset disclosure provides an imaging lens assembly such as a miniaturized long-focus lens assembly that is applicable to portable electronic products and at least or partially addresses at least one of the above disadvantages of the prior art.

In one aspect, the present disclosure provides an imaging lens assembly including, sequentially from an object side to an image side along an optical axis, a first lens, a second lens, a third lens, a fourth lens and a fifth lens. The first lens may have a positive refractive power, and both of an object-side surface and an image-side surface thereof may be convex surfaces; the second lens may have a negative refractive power, and both of an object-side surface and an image-side surface thereof may be concave surfaces; the third lens may have a positive refractive power, and an image-side surface thereof may be a convex surface; the fourth lens may have a negative refractive power, and an image-side surface thereof may be a concave surface; and the fifth lens may have a positive refractive power or a negative refractive power. Half of a maximal field-of-view HFOV of the imaging lens assembly may satisfy: $HFOV \leq 25°$.

In an implementation, an effective focal length f1 of the first lens and a spaced distance T23 on the optical axis between the second lens and the third lens may satisfy: $3.0 < f1/T23 < 5.0$.

In an implementation, a distance TTL on the optical axis from a center of the object-side surface of the first lens to an image plane of the imaging lens assembly and a total effective focal length f of the imaging lens assembly may satisfy: $TTL/f \leq 1.0$.

In an implementation, an effective focal length f1 of the first lens and a center thickness CT1 of the first lens on the optical axis may satisfy: $1.5 < f1/CT1 < 3.0$.

In an implementation, a total effective focal length f of the imaging lens assembly and a spaced distance T45 on the optical axis between the fourth lens and the fifth lens may satisfy: $4.0 < f/T45 < 6.0$.

In an implementation, a total effective focal length f of the imaging lens assembly and an effective focal length f3 of the third lens may satisfy: $0 < f/f3 < 1$.

In an implementation, an effective focal length f3 of the third lens and an effective focal length f4 of the fourth lens may satisfy: $1.5 < (f3-f4)/(f3+f4) < 8$.

In an implementation, an effective focal length f1 of the first lens and an effective focal length f2 of the second lens may satisfy: $-0.3 \leq (f1+f2)/(f1-f2) < 0$.

In an implementation, a radius of curvature R2 of the image-side surface of the first lens and a radius of curvature R3 of the object-side surface of the second lens may satisfy: $0 < (R2-R3)/(R2+R3) \leq 0.20$.

In an implementation, an effective focal length f1 of the first lens, an effective focal length f3 of the third lens and a total effective focal length f of the imaging lens assembly may satisfy: $3.0 \text{ mm} < f1*f3/f < 5.5 \text{ mm}$.

In an implementation, an effective focal length f2 of the second lens, an effective focal length f4 of the fourth lens and a total effective focal length f of the imaging lens assembly may satisfy: $2.5 \text{ mm} < f2*f4/f < 3.5 \text{ mm}$.

In another aspect, the present disclosure provides an imaging lens assembly including, sequentially from an object side to an image side along an optical axis, a first lens, a second lens, a third lens, a fourth lens and a fifth lens. The first lens may have a positive refractive power, and both of an object-side surface and an image-side surface thereof may be convex surfaces; the second lens may have a negative refractive power, and both of an object-side surface and an image-side surface thereof may be concave surfaces; the third lens may have a positive refractive power, and an image-side surface thereof may be a convex surface; the fourth lens may have a negative refractive power, and an image-side surface thereof may be a concave surface; and the fifth lens may have a positive refractive power or a negative refractive power. A distance TTL on the optical axis from a center of the object-side surface of the first lens to an image plane of the imaging lens assembly and a total effective focal length f of the imaging lens assembly may satisfy: $TTL/f \leq 1.0$.

In still another aspect, the present disclosure provides an imaging lens assembly including, sequentially from an object side to an image side along an optical axis, a first lens, a second lens, a third lens, a fourth lens and a fifth lens. The first lens may have a positive refractive power, and both of an object-side surface and an image-side surface thereof may be convex surfaces; the second lens may have a negative refractive power, and both of an object-side surface and an image-side surface thereof may be concave surfaces; the third lens may have a positive refractive power, and an image-side surface thereof may be a convex surface; the fourth lens may have a negative refractive power, and an image-side surface thereof may be a concave surface; and the fifth lens may have a positive refractive power or a negative refractive power. A total effective focal length f of the imaging lens assembly and a spaced distance T45 on the optical axis between the fourth lens and the fifth lens may satisfy: $4.0 < f/T45 < 6.0$.

In still another aspect, the present disclosure provides an imaging lens assembly including, sequentially from an object side to an image side along an optical axis, a first lens, a second lens, a third lens, a fourth lens and a fifth lens. The first lens may have a positive refractive power, and both of an object-side surface and an image-side surface thereof may be convex surfaces; the second lens may have a negative refractive power, and both of an object-side surface and an image-side surface thereof may be concave surfaces; the third lens may have a positive refractive power, and an image-side surface thereof may be a convex surface; the fourth lens may have a negative refractive power, and an image-side surface thereof may be a concave surface; and the fifth lens may have a positive refractive power or a negative refractive power. An effective focal length f3 of the third lens and an effective focal length f4 of the fourth lens may satisfy: 1.5<(f3−f4)/(f3+f4)<8.

In still another aspect, the present disclosure provides an imaging lens assembly including, sequentially from an object side to an image side along an optical axis, a first lens, a second lens, a third lens, a fourth lens and a fifth lens. The first lens may have a positive refractive power, and both of an object-side surface and an image-side surface thereof may be convex surfaces; the second lens may have a negative refractive power, and both of an object-side surface and an image-side surface thereof may be concave surfaces; the third lens may have a positive refractive power, and an image-side surface thereof may be a convex surface; the fourth lens may have a negative refractive power, and an image-side surface thereof may be a concave surface; and the fifth lens may have a positive refractive power or a negative refractive power. An effective focal length f2 of the second lens, an effective focal length f4 of the fourth lens and a total effective focal length f of the imaging lens assembly may satisfy: 2.5 mm<f2*f4/f<3.5 mm.

The present disclosure employs a plurality of (for example, five) lenses, and the imaging lens assembly described above has at least one advantageous effect such as ultra-thin, miniaturization, long-focus, low sensitivity, good processability, high imaging quality and the like by properly assigning the refractive power, the surface shape, the center thickness of each lens, and the spaced distance on the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 5 is a schematic structural view of an imaging lens assembly according to embodiment 3 of the present disclosure;

FIGS. 6A to 6D illustrate a longitudinal aberration curve, an astigmatism curve, a distortion curve and a lateral color curve of the imaging lens assembly according to embodiment 3, respectively;

FIG. 13 is a schematic structural view of an imaging lens assembly according to embodiment 7 of the present disclosure;

FIGS. 14A to 14D illustrate a longitudinal aberration curve, an astigmatism curve, a distortion curve and a lateral color curve of the imaging lens assembly according to embodiment 7, respectively;

DETAILED DESCRIPTION OF EMBODIMENTS

Figure 1:
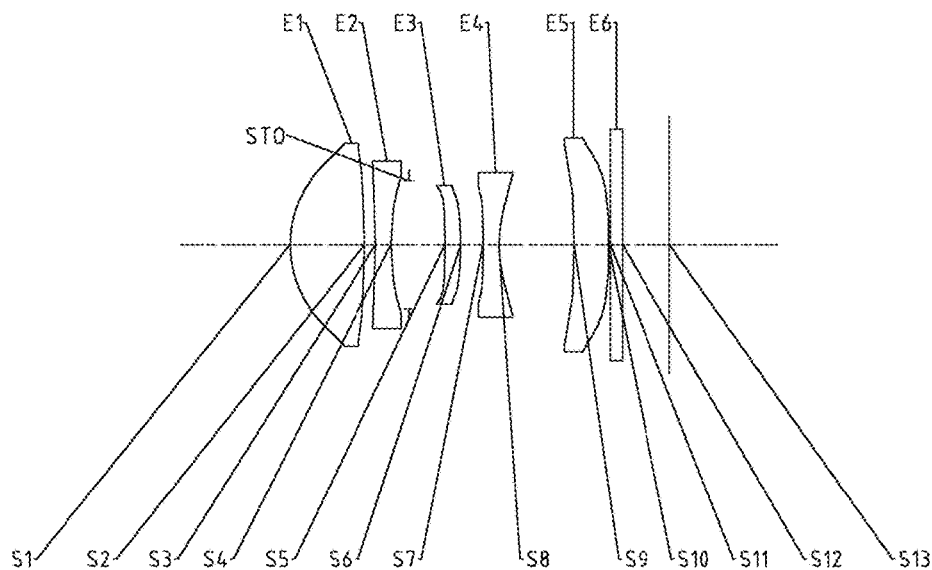
FIG. 1 is a schematic structural view of an imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object side is referred to as an object-side surface, and the surface closest to the image side is referred to as an image-side surface.

It should be further understood that the terms "comprising," "including," "having", "containing" and/or "contain", when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list.

Further, the use of "may", when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An imaging lens assembly according to exemplary implementations of the present disclosure may include, for example, five lenses having refractive power, i.e., a first lens, a second lens, a third lens, a fourth lens and a fifth lens. These five lenses are sequentially arranged from an object side to an image side along an optical axis.

In an exemplary implementation, the first lens may have a positive refractive power, and an object-side surface thereof may be a convex surface and an image-side surface thereof may also be a convex surface; the second lens may have a negative refractive power, and an object-side surface thereof may be a concave surface and an image-side surface thereof may be a concave surface; the third lens may have a positive refractive power, and an image-side surface thereof may be a convex surface; the fourth lens may have a negative refractive power, and an image-side surface thereof may be a concave surface; the fifth lens may have a positive refractive power or a negative refractive power.

In an exemplary implementation, an object-side surface of the fifth lens may be a concave surface, and an image-side surface thereof may be a convex surface.

In an exemplary implementation, the imaging lens assembly of the present disclosure may satisfy $3.0<f1/T23<5.0$, wherein f1 is an effective focal length of the first lens, and T23 is a spaced distance on the optical axis between the second lens and the third lens. More specifically, f1 and T23 may further satisfy $3.35 \leq f1/T23 \leq 4.43$. By satisfying $3.0<f1/T23<5.0$, the concentration properties of the first lens may be ensured, and the spherical aberration at the central field of view area may be effectively reduced.

In an exemplary implementation, the imaging lens assembly of the present disclosure may satisfy $TTL/f \leq 1.0$, wherein TTL is a distance on the optical axis from a center of the object-side surface of the first lens to an image plane of the imaging lens assembly, and f is a total effective focal length of the imaging lens assembly. More specifically, TTL and f may further satisfy $0.87 \leq TTL/f \leq 0.90$. Satisfying $TTL/f \leq 1.0$ may ensure the miniaturization of the imaging lens assembly while ensuring the long-focus characteristic.

In an exemplary implementation, the imaging lens assembly of the present disclosure may satisfy $1.5<f1/CT1<3.0$, wherein f1 is an effective focal length of the first lens, and CT1 is a center thickness of the first lens on the optical axis. More specifically, f1 and CT1 may further satisfy $1.91 \leq f1/CT1 \leq 2.55$. By satisfying $1.5<f1/CT1<3.0$, the processing characteristic of the first lens can be effectively ensured, and the requirement for miniaturization of the imaging lens assembly can be met.

In an exemplary implementation, the imaging lens assembly of the present disclosure may satisfy $4.0<f/T45<6.0$, wherein f is a total effective focal length f of the imaging lens assembly, and T45 is a spaced distance on the optical axis between the fourth lens and the fifth lens. More specifically, f and T45 may further satisfy $4.31 \leq f/T45 \leq 5.79$. By properly arranging the spaced distance between the fourth lens and the fifth lens, the distortion magnitude at edge field of view area can be effectively ensured.

In an exemplary implementation, the imaging lens assembly of the present disclosure may satisfy $0<f/f3<1$, wherein f is a total effective focal length f of the imaging lens assembly, and f3 is an effective focal length of the third lens. More specifically, f and f3 may further satisfy $0.50 \leq f/f3 \leq 0.90$, for example, $0.60 \leq f/f3 \leq 0.82$. By properly assigning the refractive powers of the third lens and the fourth lens, the sensitivity of the imaging lens assembly is advantageously reduced and the processability of the imaging lens assembly is improved.

In an exemplary implementation, the imaging lens assembly of the present disclosure may satisfy $1.5<(f3-f4)/(f3+f4)<8$, wherein f3 is an effective focal length of the third lens, and f4 is an effective focal length of the fourth lens. More specifically, f3 and f4 may further satisfy $1.99 \leq (f3-f4)/(f3+f4) \leq 7.65$. By properly assigning the refractive powers of the third lens and the fourth lens, the on-axis chromatic aberration of the imaging lens assembly can be balanced.

In an exemplary implementation, the imaging lens assembly of the present disclosure may satisfy $-0.3 \leq (f1+f2)/(f1-f2)<0$, wherein f1 is an effective focal length of the first lens, and f2 is an effective focal length of the second lens. More specifically, f1 and f2 may further satisfy $-0.29 \leq (f1+f2)/(f1-f2) \leq -0.08$. By properly assigning the refractive powers of the first lens and the second lens, the aberration at the edge field of view area is advantageously reduced.

In an exemplary implementation, the imaging lens assembly of the present disclosure may satisfy 0<(R2−R3)/(R2+R3)≤0.20, wherein R2 is a radius of curvature of the image-side surface of the first lens, and R3 is a radius of curvature of the object-side surface of the second lens. More specifically, R2 and R3 may further satisfy 0.05≤(R2−R3)/(R2+R3)≤0.20. By properly distributing the radii of curvature of the image-side surface of the first lens and the object-side surface of the second lens, the high-order spherical aberration and high-order astigmatism of the imaging lens assembly are advantageously compensated.

In an exemplary implementation, the imaging lens assembly of the present disclosure may satisfy 3.0 mm<f1*f3/f<5.5 mm, wherein f1 is an effective focal length of the first lens, f3 is an effective focal length of the third lens, and f is a total effective focal length of the imaging lens assembly. More specifically, f1, f3 and f may further satisfy 3.32 mm≤f1*f3/f≤5.34 mm. By properly assigning f1, f3 and f, the field-of-view angle is advantageously reduced, and the imaging lens assembly can better meet the needs for long-distance imaging.

In an exemplary implementation, the imaging lens assembly of the present disclosure may satisfy 2.5 mm<f2*f4/f<3.5 mm, wherein f2 is an effective focal length of the second lens, f4 is an effective focal length of the fourth lens, and f is a total effective focal length of the imaging lens assembly. More specifically, f2, f4 and f may further satisfy 2.62 mm≤f2*f4/f≤3.28 mm. By properly assigning f2, f4 and f, the primary aberration and high-order aberration of the imaging lens assembly are advantageously compensated, and the long-focus characteristic of the imaging lens assembly is achieved while ensuring the miniaturization of the imaging lens assembly.

In an exemplary implementation, the imaging lens assembly of the present disclosure may satisfy HFOV≤25°, wherein HFOV is half of a maximal field-of-view of the imaging lens assembly. More specifically, HFOV may further satisfy 16.0°≤HFOV≤16.6°. By satisfying HFOV≤25°, the long-focus characteristic of the imaging lens assembly is advantageously achieved.

In an exemplary implementation, the imaging lens assembly may further include at least one diaphragm to improve the imaging quality of the lens assembly. For example, the diaphragm may be disposed between the second lens and the third lens, and as another example, the diaphragm may be disposed between the object side and the first lens.

Alternatively, the imaging lens assembly described above may further include an optical filter for correcting chromatic aberration and/or a protective glass for protecting a photosensitive element on the image plane.

The imaging lens assembly according to the above implementations of the present disclosure may employ a plurality of lenses, such as the five lenses described above. By properly assigning the refractive power, the surface shape, the center thickness of each lens, and spaced distances on the optical axis between the lenses, the size and the sensitivity of the imaging lens assembly may be effectively reduced, and the processability of the imaging lens assembly may be improved, such that the imaging lens assembly is more advantageous for production processing and can be applied to portable electronic products. At the same time, the imaging lens assembly configured as described above also has advantageous effects such as ultra-thin, long-focus, high imaging quality, and the like.

In the implementations of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging can be eliminated as much as possible, and thus improving imaging quality.

However, it will be understood by those skilled in the art that the number of lenses constituting the imaging lens assembly can be varied to achieve the various results and advantages described in this specification without departing from the technical solution claimed by the present disclosure. For example, although the implementation are described by taking fifth lenses as an example, the imaging lens assembly is not limited to including fifth lenses. The imaging lens assembly can also include other numbers of lenses if desired.

Specific embodiments applicable to the imaging lens assembly of the above implementations will be further described below with reference to the accompanying drawings.

Embodiment 1

An imaging lens assembly according to embodiment 1 of the present disclosure is described below with reference to FIG. 1 to FIG. 2D. FIG. 1 is a schematic structural view of an imaging lens assembly according to embodiment 1 of the present disclosure.

As shown in FIG. 1, the imaging lens assembly according to an example implementation of the present disclosure includes, sequentially from an object side to an image side along an optical axis, a first lens E1, a second lens E2, a third lens E3, a fourth lens E4, a fifth lens E5 and an image plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a concave surface, and an image-side surface S10 thereof is a convex surface.

Alternatively, the imaging lens assembly may further include an optical filter E6 having an object-side surface S11 and an image-side surface S12. Light from the object sequentially passes through the respective surfaces S1 to S12 and is finally imaged on the image plane S13.

Alternatively, the imaging lens assembly may further include a diaphragm STO disposed between the second lens E2 and the third lens E3 to improve the imaging quality of the lens assembly.

Table 1 shows the surface type, radius of curvature, thickness, material and conic coefficient of each lens of the imaging lens assembly in embodiment 1, wherein the units for the radius of curvature and the thickness are millimeter (mm).

TABLE 1

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.8591 | 1.2570 | 1.54 | 55.7 | −0.3849 |
| S2 | aspheric | −17.9765 | 0.1861 | | | 99.0000 |
| S3 | aspheric | −16.2959 | 0.2600 | 1.67 | 20.4 | 20.4152 |
| S4 | aspheric | 4.0053 | 0.3062 | | | −34.7558 |
| STO | spherical | infinite | 0.6000 | | | |
| S5 | aspheric | −76.7892 | 0.2679 | 1.65 | 23.5 | 99.0000 |
| S6 | aspheric | −5.3592 | 0.3728 | | | −70.0990 |
| S7 | aspheric | 91.3459 | 0.2700 | 1.55 | 56.1 | −34.7324 |
| S8 | aspheric | 2.1240 | 1.2612 | | | −5.0000 |
| S9 | aspheric | −100.0000 | 0.5789 | 1.65 | 23.5 | −99.0000 |
| S10 | aspheric | −100.0000 | 0.0300 | | | 99.0000 |
| S11 | spherical | infinite | 0.2100 | 1.52 | 64.2 | |
| S12 | spherical | infinite | 0.7900 | | | |
| S13 | spherical | infinite | | | | |

As can be seen from Table 1, the object-side surface and the image-side surface of any one of the first lens E1 to the fifth lens E5 are aspheric. In this embodiment, the surface shape x of each aspheric lens may be defined by using, but not limited to, the following aspheric formula:

$$x = \frac{ch^2}{1 + \sqrt{1 - (k+1)c^2h^2}} + \sum A_i h^i \qquad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature in the above Table 1); k is the conic coefficient (given in Table 1); Ai is a correction coefficient for the i-th order of the aspheric surface. Table 2 below shows high-order coefficients A4, A6, A8, A10, A12, A14, A16, A18 and A20 applicable to each aspheric surface S1-S10 in embodiment 1.

area on the image plane S13 satisfies ImgH=2.15 mm. Half of a maximal field-of-view HFOV of the imaging lens assembly satisfies HFOV=16.0°.

The imaging lens assembly in embodiment 1 satisfies:

f1/T23=3.54, where f1 is the effective focal length of the first lens E1, and T23 is the spaced distance on the optical axis between the second lens E2 and the third lens E3;

TTL/f=0.87, where TTL is the total track length of the imaging lens assembly, and f is the total effective focal length of the imaging lens assembly;

f1/CT1=2.55, where f1 is the effective focal length of the first lens E1, and CT1 is the center thickness of the first lens E1 on the optical axis;

f/T45=5.79, where f is the total effective focal length of the imaging lens assembly, and T45 is the spaced distance on the optical axis between the fourth lens E4 and the fifth lens E5;

f/f3=0.82, where f is the total effective focal length of the imaging lens assembly, and f3 is the effective length of the third lens E3;

TABLE 2

| Surface number | A4 | A6 | A8 | A10 | A12 | A14 | A16 | A18 | A20 |
|---|---|---|---|---|---|---|---|---|---|
| S1 | 5.6390E−03 | −7.2600E−03 | 1.9167E−02 | −2.4190E−02 | 1.8396E−02 | −8.3200E−03 | 2.1040E−03 | −2.5000E−04 | 4.8800E−06 |
| S2 | −4.3220E−02 | 1.0205E−01 | −1.2552E−01 | 1.1807E−01 | −8.5150E−02 | 4.2530E−02 | −1.3350E−02 | 2.3250E−03 | −1.7000E−04 |
| S3 | −1.1041E−01 | 2.8836E−01 | −4.2568E−01 | 4.7040E−01 | −4.0245E−01 | 2.4944E−01 | −1.0098E−01 | 2.3398E−02 | −2.3300E−03 |
| S4 | −1.3590E−02 | 2.1409E−01 | −5.6802E−01 | 1.1330E+00 | −1.6333E+00 | 1.5547E+00 | −9.0983E−01 | 2.9590E−01 | −4.1000E−02 |
| S5 | −1.8040E−02 | −8.6370E−02 | 2.2982E−01 | −1.3021E+00 | 3.1009E+00 | −4.3760E+00 | 3.7329E+00 | −1.7523E+00 | 3.4310E−01 |
| S6 | −1.0190E−02 | −4.0450E−02 | 1.7128E−02 | −7.0956E−01 | 1.9806E+00 | −2.8336E+00 | 2.4295E+00 | −1.1760E+00 | 2.4505E−01 |
| S7 | −4.3870E−02 | 1.0163E−02 | −4.8495E−01 | 1.7566E+00 | −4.0462E+00 | 6.0498E+00 | −5.4681E+00 | 2.7049E+00 | −5.6453E−01 |
| S8 | −2.3120E−02 | 1.2133E−02 | −1.2298E−01 | 3.7725E−01 | −6.7935E−01 | 8.3168E−01 | −6.4025E−01 | 2.7167E−01 | −4.8200E−02 |
| S9 | −5.3840E−02 | 3.4079E−02 | −3.4030E−02 | 3.0829E−02 | −1.9290E−02 | 7.6970E−03 | −1.8000E−03 | 2.2200E−04 | −1.1000E−05 |
| S10 | −7.3400E−02 | 2.8454E−02 | −1.8990E−02 | 1.0514E−02 | −4.1900E−03 | 1.1820E−03 | −2.5000E−04 | 3.8100E−05 | −2.9000E−06 |

In embodiment 1, a total effective focal length f of the imaging lens assembly satisfies f=7.31 mm, an effective focal length f1 of the first lens E1 satisfies f1=3.21 mm, an effective focal length f2 of second lens E2 satisfies f2=−4.80 mm, an effective focal length f3 of third lens E3 satisfies f3=8.94 mm, an effective length f4 of the fourth lens E4 satisfies f4=−3.99 mm, and an effective length f5 of the fifth lens E5 satisfies f5=68561.24 mm. The total track length TTL of the imaging lens assembly (i.e., the distance on the optical axis from the center of the object-side surface S1 of the first lens E1 to the image plane S13) satisfies TTL=6.39 mm. Half of a diagonal length ImgH of an effective pixel (f3−f4)/(f3+f4)=2.61, where f3 is the effective focal length of the third lens E3, and f4 is the effective length of the fourth lens E4;

(f1+f2)/(f1−f2)=−0.20, where f1 is the effective focal length of the first lens E1, and f2 is the effective focal length of the second lens E2;

(R2−R3)/(R2+R3)=0.05, where R2 is the radius of curvature of the image-side surface S2 of the first lens E1, and R3 is the radius of curvature of the object-side surface S3 of the second lens E2;

$f1*f3/f=3.93$ mm, where f1 is the effective focal length of the first lens E1, f3 is the effective length of the third lens E3, and f is the total effective focal length of the imaging lens assembly;

$f2*f4/f=2.62$ mm, where f2 is the effective focal length of the second lens E2, f4 is the effective focal length of the fourth lens E4, and f is the total effective focal length of the imaging lens assembly.

Figures 2A, 2B:
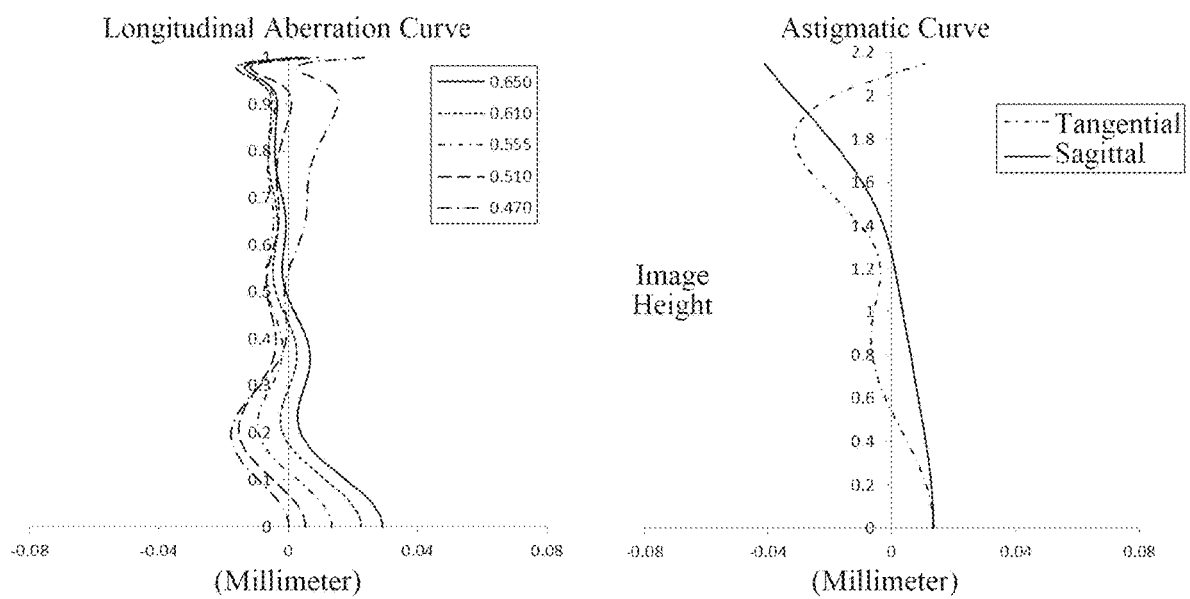
FIGS. 2A to 2D illustrate a longitudinal aberration curve, an astigmatism curve, a distortion curve and a lateral color curve of the imaging lens assembly according to embodiment 1, respectively.
Figures 2C, 2D:
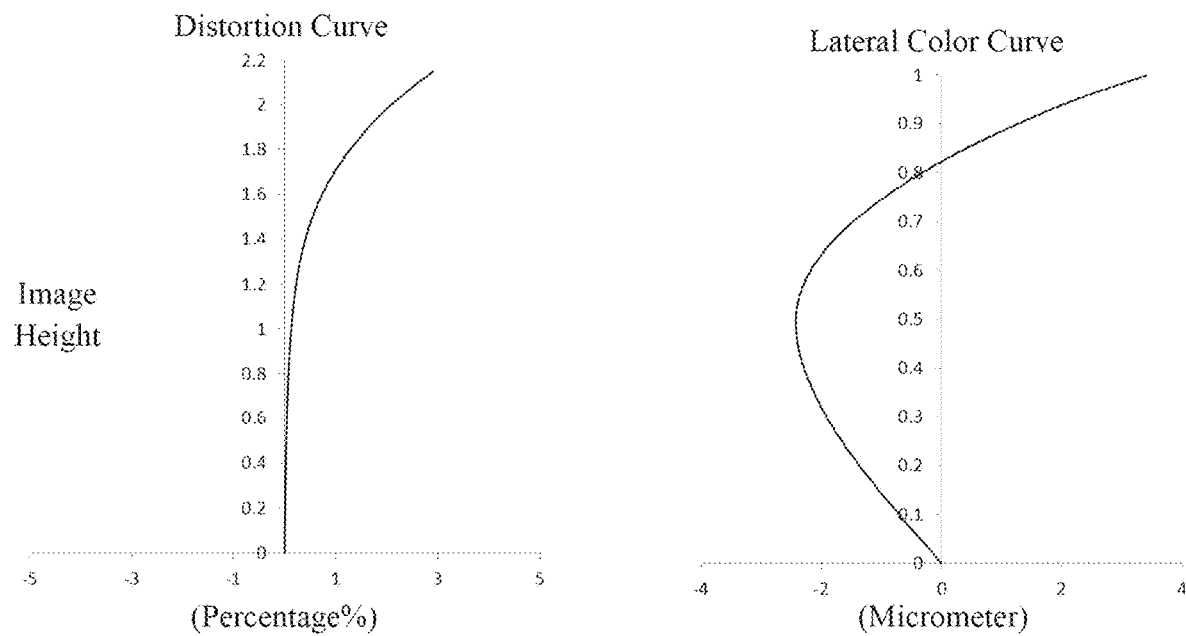

In addition, FIG. 2A illustrates a longitudinal aberration curve of the imaging lens assembly according to embodiment 1, representing deviations of focal points converged by light of different wavelengths after passing through the imaging lens assembly. FIG. 2B illustrates an astigmatism curve of the imaging lens assembly according to embodiment 1, representing a curvature of a tangential plane and a curvature of a sagittal plane. FIG. 2C illustrates a distortion curve of the imaging lens assembly according to embodiment 1, representing amounts of distortion at different view angles. FIG. 2D illustrates a lateral color curve of the imaging lens assembly according to embodiment 1, representing deviations of different image heights on an image plane after light passes through the imaging lens assembly. It can be seen from FIG. 2A to FIG. 2D that the imaging lens assembly provided in embodiment 1 may achieve a good imaging quality.

Embodiment 2

Figure 3:
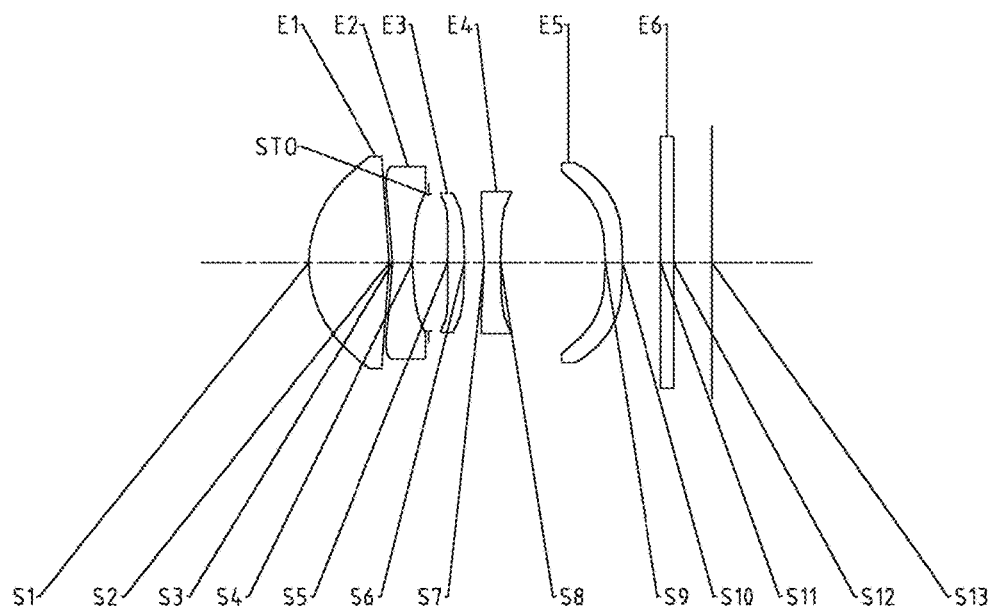
FIG. 3 is a schematic structural view of an imaging lens assembly according to embodiment 2 of the present disclosure.

An imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the imaging lens assembly according to embodiment 2 of the present disclosure.

As shown in FIG. 3, the imaging lens assembly according to an exemplary implementation of the present disclosure includes, sequentially from an object side to an image side along an optical axis, a first lens E1, a second lens E2, a third lens E3, a fourth lens E4, a fifth lens E5 and an image plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a convex surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a concave surface, and an image-side surface S10 thereof is a convex surface.

Alternatively, the imaging lens assembly may further include an optical filter E6 having an object-side surface S11 and an image-side surface S12. Light from the object sequentially passes through the respective surfaces S1 to S12 and is finally imaged on the image plane S13.

Alternatively, the imaging lens assembly may further include a diaphragm STO disposed between the second lens E2 and the third lens E3 to improve the imaging quality of the lens assembly.

Table 3 shows the surface type, radius of curvature, thickness, material and conic coefficient of each lens of the imaging lens assembly in embodiment 2, wherein the units for the radius of curvature and the thickness are millimeter (mm).

TABLE 3

| Surface number | Surface type | Radius of curvature | Thickness | Material | | Conic coefficient |
| | | | | Refractive index | Abbe number | |
| --- | --- | --- | --- | --- | --- | --- |
| OBJ | spherical | infinite | infinite | | | |
| S1 | aspheric | 1.8514 | 1.2808 | 1.55 | 56.1 | −0.3269 |
| S2 | aspheric | −3.5975 | 0.0548 | | | −53.9462 |
| S3 | aspheric | −3.0857 | 0.3105 | 1.65 | 23.5 | −43.3374 |
| S4 | aspheric | 4.6810 | 0.2647 | | | −53.3488 |
| STO | spherical | infinite | 0.2938 | | | |
| S5 | aspheric | 13.0405 | 0.2691 | 1.67 | 20.4 | 99.0000 |
| S6 | aspheric | −12.7363 | 0.3106 | | | 12.1536 |
| S7 | aspheric | −5.1163 | 0.2600 | 1.55 | 56.1 | −69.6135 |
| S8 | aspheric | 20.4982 | 1.6582 | | | 99.0000 |
| S9 | aspheric | −4.9417 | 0.2720 | 1.55 | 56.1 | 1.5282 |
| S10 | aspheric | −18.8159 | 0.6096 | | | 132.4224 |
| S11 | spherical | infinite | 0.2100 | 1.52 | 64.2 | |
| S12 | spherical | infinite | 0.6060 | | | |
| S13 | spherical | infinite | | | | |

As can be seen from Table 3, in embodiment 2, the object-side surface and the image-side surface of any one of the first lens E1 to the fifth lens E5 are aspheric. Table 4 shows high-order coefficients applicable to each aspheric surface in embodiment 2, wherein the surface shape of each aspheric surface may be defined by the formula (1) given in the above embodiment 1.

TABLE 4

| Surface number | A4 | A6 | A8 | A10 | A12 | A14 | A16 | A18 | A20 |
| --- | --- | --- | --- | --- | --- | --- | --- | --- | --- |
| S1 | 3.6220E−03 | 1.3007E−02 | −2.1420E−02 | 2.4524E−02 | −1.5890E−02 | 5.6520E−03 | −8.8000E−04 | 3.9617E−06 | 5.6200E−06 |
| S2 | 1.1703E−02 | 5.7752E−02 | −1.0738E−01 | 2.0698E−02 | 1.0215E−01 | −1.1597E−01 | 5.6443E−02 | −1.3417E−02 | 1.2740E−03 |

TABLE 4-continued

| Surface number | A4 | A6 | A8 | A10 | A12 | A14 | A16 | A18 | A20 |
|---|---|---|---|---|---|---|---|---|---|
| S3 | 6.1420E-03 | 5.5697E-02 | -6.4210E-02 | -1.1146E-01 | 3.1124E-01 | -2.9871E-01 | 1.4647E-01 | -3.6878E-02 | 3.8000E-03 |
| S4 | 1.3852E-01 | -3.5074E-01 | 1.3582E+00 | -3.6324E+00 | 6.1801E+00 | -6.5944E+00 | 4.2957E+00 | -1.5636E+00 | 2.4409E-01 |
| S5 | -6.3680E-02 | 3.2919E-02 | -2.1809E-01 | 2.8740E-01 | -2.4158E-01 | 1.0644E-01 | -1.7150E-02 | 0.0000E+00 | 0.0000E+00 |
| S6 | -4.1780E-02 | -2.6620E-02 | -5.2100E-02 | 6.2561E-02 | -2.7426E-02 | -3.2600E-03 | 5.5120E-03 | 0.0000E+00 | 0.0000E+00 |
| S7 | -2.6200E-02 | 3.7653E-02 | 4.1712E-02 | -5.3830E-02 | 2.1067E-02 | -3.5300E-03 | 2.1700E-04 | 0.0000E+00 | 0.0000E+00 |
| S8 | 6.3994E-02 | -1.7550E-02 | 1.0275E-01 | -9.9940E-02 | 4.3486E-02 | -9.8100E-03 | 8.9300E-04 | 0.0000E+00 | 0.0000E+00 |
| S9 | -1.8666E-01 | 8.1860E-02 | -4.3280E-02 | 1.4386E-02 | -2.0349E-03 | 7.3100E-05 | 3.8900E-06 | 0.0000E+00 | 0.0000E+00 |
| S10 | -1.8607E-01 | 9.7703E-02 | -6.3550E-02 | 3.1214E-02 | -1.0118E-02 | 1.7920E-03 | -1.3000E-04 | 0.0000E+00 | 0.0000E+00 |

In embodiment 2, a total effective focal length f of the imaging lens assembly satisfies f=7.15 mm, an effective focal length f1 of the first lens E1 satisfies f1=2.44 mm, an effective focal length f2 of second lens E2 satisfies f2=-2.85 mm, an effective focal length f3 of third lens E3 satisfies f3=9.72 mm, an effective length f4 of the fourth lens E4 satisfies f4=-7.47 mm, and an effective length f5 of the fifth lens E5 satisfies f5=-12.36 mm. The total track length TTL of the imaging lens assembly satisfies TTL=6.40 mm. Half of a diagonal length ImgH of an effective pixel area on the image plane S13 satisfies ImgH=2.16 mm. Half of a maximal field-of-view HFOV of the imaging lens assembly satisfies HFOV=16.1°

Figure 4A:
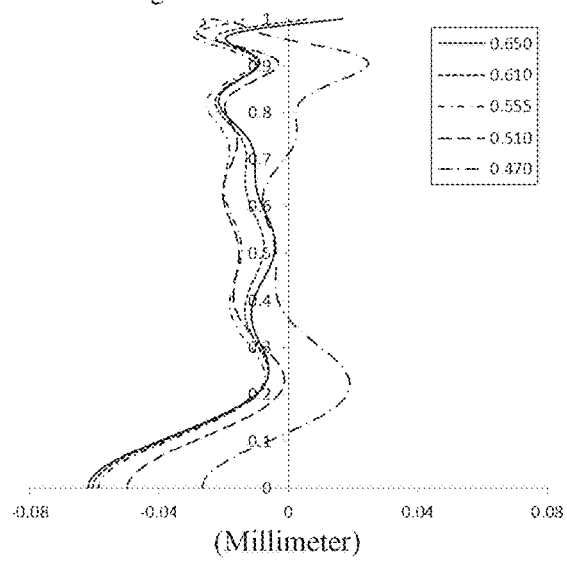
FIGS. 4A to 4D illustrate a longitudinal aberration curve, an astigmatism curve, a distortion curve and a lateral color curve of the imaging lens assembly according to embodiment 2, respectively.
Figure 4B:
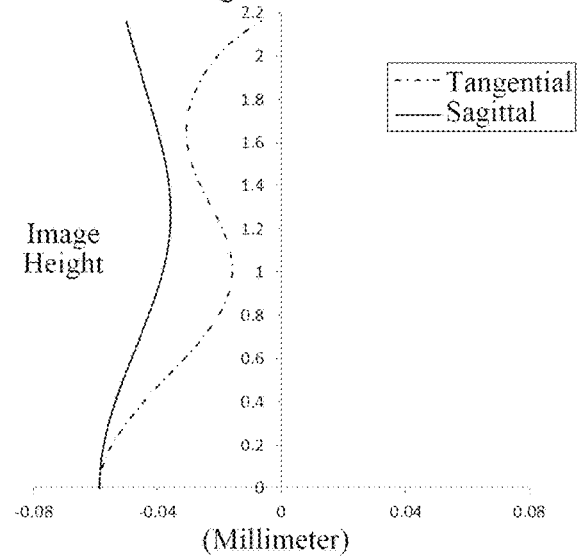
Figure 4C:
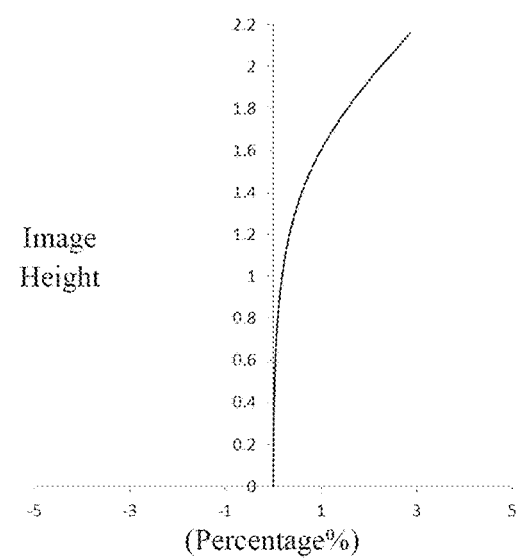
Figure 4D:
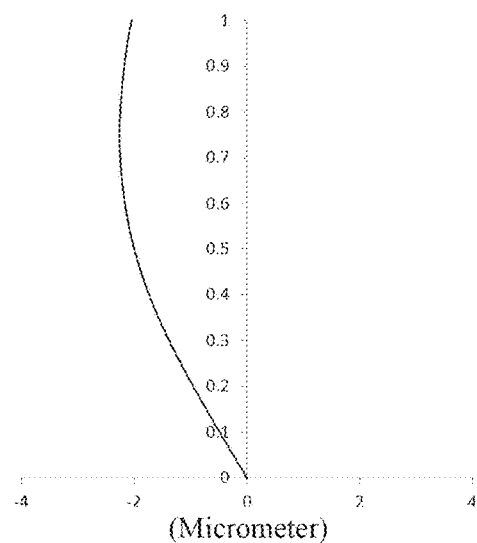

FIG. 4A illustrates a longitudinal aberration curve of the imaging lens assembly according to embodiment 2, representing deviations of focal points converged by light of different wavelengths after passing through the imaging lens assembly. FIG. 4B illustrates an astigmatism curve of the imaging lens assembly according to embodiment 2, representing a curvature of a tangential plane and a curvature of a sagittal plane. FIG. 4C illustrates a distortion curve of the imaging lens assembly according to embodiment 2, representing amounts of distortion at different view angles. FIG. 4D illustrates a lateral color curve of the imaging lens assembly according to embodiment 2, representing deviations of different image heights on an image plane after light passes through the imaging lens assembly. It can be seen from FIG. 4A to FIG. 4D that the imaging lens assembly provided in embodiment 2 may achieve a good imaging quality.

Embodiment 3

An imaging lens assembly according to embodiment 3 of the present disclosure is described below with reference to FIG. 5 to FIG. 6D. FIG. 5 is a schematic structural view of the imaging lens assembly according to embodiment 3 of the present disclosure.

As shown in FIG. 5, the imaging lens assembly according to an exemplary implementation of the present disclosure includes, sequentially from an object side to an image side along an optical axis, a first lens E1, a second lens E2, a third lens E3, a fourth lens E4, a fifth lens E5 and an image plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a concave surface, and an image-side surface S10 thereof is a convex surface.

Alternatively, the imaging lens assembly may further include an optical filter E6 having an object-side surface S11 and an image-side surface S12. Light from the object sequentially passes through the respective surfaces S1 to S12 and is finally imaged on the image plane S13.

Alternatively, the imaging lens assembly may further include a diaphragm STO disposed between the second lens E2 and the third lens E3 to improve the imaging quality of the lens assembly.

Table 5 shows the surface type, radius of curvature, thickness, material and conic coefficient of each lens of the imaging lens assembly in embodiment 3, wherein the units for the radius of curvature and the thickness are millimeter (mm).

TABLE 5

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 1.8612 | 1.2645 | 1.54 | 55.7 | -0.3751 |
| S2 | aspheric | -17.7079 | 0.0876 | | | 99.0000 |
| S3 | aspheric | -14.7675 | 0.2600 | 1.67 | 20.4 | -5.4421 |
| S4 | aspheric | 5.3822 | 0.3593 | | | -48.2018 |
| STO | spherical | infinite | 0.6000 | | | |
| S5 | aspheric | -17.0204 | 0.2600 | 1.65 | 23.5 | -99.0000 |
| S6 | aspheric | -5.2576 | 0.2665 | | | -99.0000 |
| S7 | aspheric | 12.5284 | 0.2700 | 1.55 | 56.1 | -68.0299 |
| S8 | aspheric | 1.8027 | 1.3331 | | | -4.3891 |

TABLE 5-continued

| Surface number | Surface type | Radius of curvature | Thickness | Material Refractive index | Abbe number | Conic coefficient |
|---|---|---|---|---|---|---|
| S9 | aspheric | −100.0000 | 0.5914 | 1.65 | 23.5 | −99.0000 |
| S10 | aspheric | −100.0000 | 0.0638 | | | −99.0000 |
| S11 | spherical | infinite | 0.2100 | 1.52 | 64.2 | |
| S12 | spherical | infinite | 0.8239 | | | |
| S13 | spherical | infinite | | | | |

As can be seen from Table 5, in embodiment 3, the object-side surface and the image-side surface of any one of the first lens E1 to the fifth lens E5 are aspheric. Table 6 shows high-order coefficients applicable to each aspheric surface in embodiment 3, wherein the surface shape of each aspheric surface may be defined by the formula (1) given in the above embodiment 1.

TABLE 6

| Surface number | A4 | A6 | A8 | A10 | A12 | A14 | A16 | A18 | A20 |
|---|---|---|---|---|---|---|---|---|---|
| S1 | 5.4400E−03 | −4.5200E−03 | 1.1667E−02 | −1.2060E−02 | 6.2690E−03 | −6.5000E−04 | −8.9000E−04 | 4.1700E−04 | −5.9685E−05 |
| S2 | −8.0780E−02 | 2.1485E−01 | −3.2263E−01 | 3.5881E−01 | −2.8845E−01 | 1.5595E−01 | −5.2640E−02 | 9.8970E−03 | −7.8524E−04 |
| S3 | −1.1351E−01 | 3.2532E−01 | −5.2622E−01 | 6.1631E−01 | −5.2088E−01 | 2.9910E−01 | −1.0776E−01 | 2.1609E−02 | −1.8108E−03 |
| S4 | −9.5400E−03 | 1.6470E−01 | −4.1406E−01 | 7.1880E−01 | −8.6800E−01 | 6.8413E−01 | −3.2693E−01 | 8.4523E−02 | −8.8731E−03 |
| S5 | −3.9980E−02 | 3.1766E−02 | −3.8326E−01 | 1.1310E+00 | −2.6309E+00 | 3.9222E+00 | −3.4681E+00 | 1.6669E+00 | −3.3517E−01 |
| S6 | −7.1110E−02 | 2.5925E−01 | −1.1130E+00 | 2.9917E+00 | −6.0966E+00 | 8.3280E+00 | −6.9721E+00 | 3.2219E+00 | −6.2826E−01 |
| S7 | −1.2804E−01 | 3.4078E−01 | −1.1720E+00 | 3.1525E+00 | −6.5670E+00 | 9.2670E+00 | −8.1316E+00 | 3.9851E+00 | −8.3201E−01 |
| S8 | −8.7690E−02 | 2.8258E−01 | −6.8806E−01 | 1.4265E+00 | −2.3533E+00 | 2.7343E+00 | −2.0237E+00 | 8.4538E−01 | −1.5091E−01 |
| S9 | −5.9420E−02 | 1.3095E−02 | 2.4672E−02 | −4.0090E−02 | 3.1884E−02 | −1.4760E−02 | 3.9480E−03 | −5.6000E−04 | 3.2412E−05 |
| S10 | −7.5520E−02 | 1.5869E−02 | 2.8080E−03 | −3.5700E−03 | −7.9000E−04 | 1.9060E−03 | −8.7000E−04 | 1.6900E−04 | −1.2177E−05 |

In embodiment 3, a total effective focal length f of the imaging lens assembly satisfies f=7.31 mm, an effective focal length f1 of the first lens E1 satisfies f1=3.21 mm, an effective focal length f2 of second lens E2 satisfies f2=−5.89 mm, an effective focal length f3 of third lens E3 satisfies f3=11.72 mm, an effective length f4 of the fourth lens E4 satisfies f4=−3.89 mm, and an effective length f5 of the fifth lens E5 satisfies f5=67120.11 mm. The total track length TTL of the imaging lens assembly satisfies TTL=6.39 mm. Half of a diagonal length ImgH of an effective pixel area on the image plane S13 satisfies ImgH=2.15 mm. Half of a maximal field-of-view HFOV of the imaging lens assembly satisfies HFOV=16.1°.

Figures 6C, 6D:
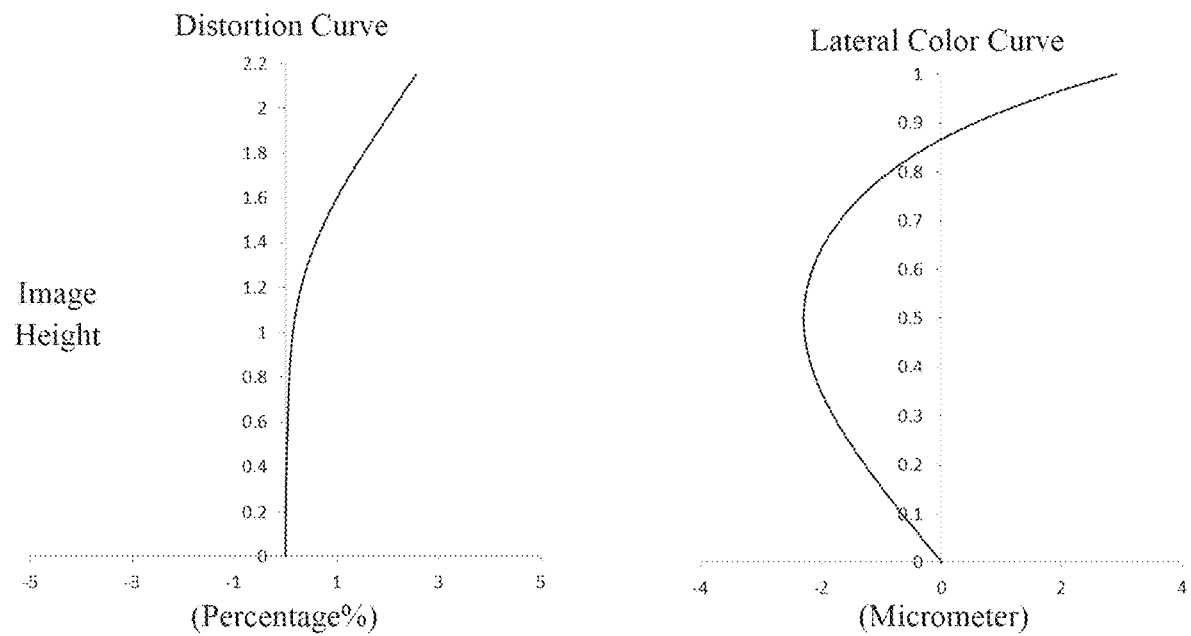

FIG. 6A illustrates a longitudinal aberration curve of the imaging lens assembly according to embodiment 3, representing deviations of focal points converged by light of different wavelengths after passing through the imaging lens assembly. FIG. 6B illustrates an astigmatism curve of the imaging lens assembly according to embodiment 3, representing a curvature of a tangential plane and a curvature of a sagittal plane. FIG. 6C illustrates a distortion curve of the imaging lens assembly according to embodiment 3, representing amounts of distortion at different view angles. FIG. 6D illustrates a lateral color curve of the imaging lens assembly according to embodiment 3, representing deviations of different image heights on an image plane after light passes through the imaging lens assembly. It can be seen from FIG. 6A to FIG. 6D that the imaging lens assembly provided in embodiment 3 may achieve a good imaging quality.

Embodiment 4

Figure 7:
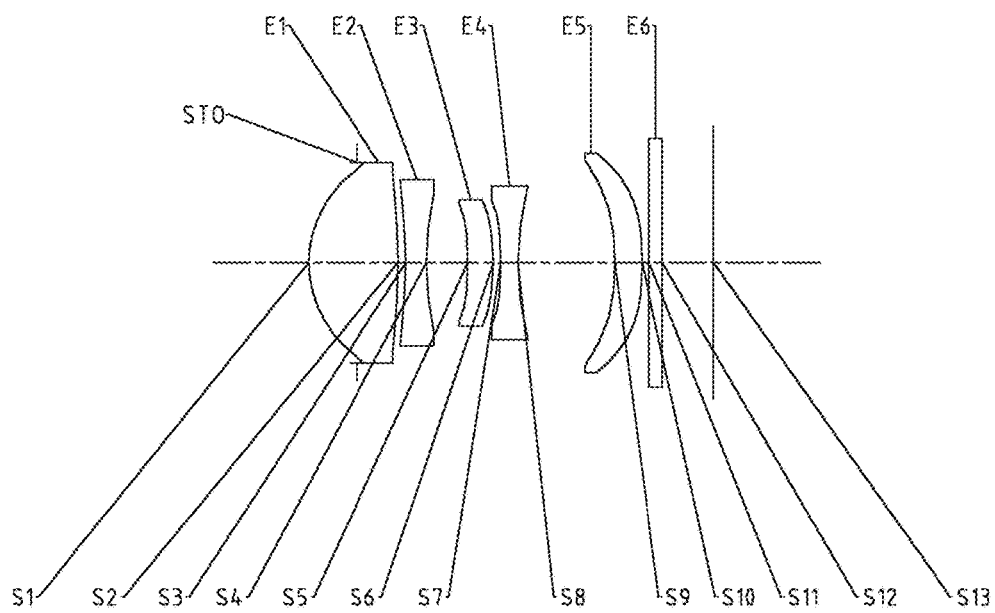
FIG. 7 is a schematic structural view of an imaging lens assembly according to embodiment 4 of the present disclosure.

An imaging lens assembly according to embodiment 4 of the present disclosure is described below with reference to FIG. 7 to FIG. 8D. FIG. 7 is a schematic structural view of the imaging lens assembly according to embodiment 4 of the present disclosure.

As shown in FIG. 7, the imaging lens assembly according to an exemplary implementation of the present disclosure includes, sequentially from an object side to an image side along an optical axis, a first lens E1, a second lens E2, a third lens E3, a fourth lens E4, a fifth lens E5 and an image plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a convex surface.

Alternatively, the imaging lens assembly may further include an optical filter E6 having an object-side surface S11 and an image-side surface S12. Light from the object sequentially passes through the respective surfaces S1 to S12 and is finally imaged on the image plane S13.

Alternatively, the imaging lens assembly may further include a diaphragm STO disposed between the object side and the first lens E1 to improve the imaging quality of the lens assembly.

Table 7 shows the surface type, radius of curvature, thickness, material and conic coefficient of each lens of the imaging lens assembly in embodiment 4, wherein the units for the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.7630 | | | |
| S1 | aspheric | 1.8031 | 1.4176 | 1.55 | 56.1 | −0.3312 |
| S2 | aspheric | −8.3669 | 0.1218 | | | 17.5202 |
| S3 | aspheric | −6.6359 | 0.3224 | 1.66 | 21.5 | −36.9370 |
| S4 | aspheric | 4.9136 | 0.6547 | | | −51.8981 |
| S5 | aspheric | −6.0806 | 0.4043 | 1.65 | 23.5 | −43.8649 |
| S6 | aspheric | −3.4765 | 0.1156 | | | −85.7490 |
| S7 | aspheric | −9.7920 | 0.2700 | 1.55 | 56.1 | 20.3980 |
| S8 | aspheric | 3.3073 | 1.5281 | | | −10.4346 |
| S9 | aspheric | −6.0141 | 0.4329 | 1.65 | 23.5 | −5.5418 |
| S10 | aspheric | −6.3718 | 0.1132 | | | 5.7874 |
| S11 | spherical | infinite | 0.2100 | 1.52 | 64.2 | |
| S12 | spherical | infinite | 0.8093 | | | |
| S13 | spherical | infinite | | | | |

As can be seen from Table 7, in embodiment 4, the object-side surface and the image-side surface of any one of the first lens E1 to the fifth lens E5 are aspheric. Table 8 shows high-order coefficients applicable to each aspheric surface in embodiment 4, wherein the surface shape of each aspheric surface may be defined by the formula (1) given in the above embodiment 1.

TABLE 8

| Surface number | A4 | A6 | A8 | A10 | A12 | A14 | A16 | A18 | A20 |
|---|---|---|---|---|---|---|---|---|---|
| S1 | 3.7810E−03 | 8.2030E−03 | −2.1540E−02 | 3.7564E−02 | −3.8260E−02 | 2.3820E−02 | −8.9100E−03 | 1.8470E−03 | −1.7000E−04 |
| S2 | 1.7550E−03 | 1.6839E−02 | 5.7087E−02 | −1.6513E−01 | 1.9271E−01 | −1.2587E−01 | 4.7821E−02 | −9.8800E−03 | 8.5800E−04 |
| S3 | −5.5360E−02 | 9.4706E−02 | 3.4460E−02 | −3.2054E−01 | 5.0684E−01 | −4.1848E−01 | 1.9877E−01 | −5.1440E−02 | 5.6400E−03 |
| S4 | 1.1061E−02 | 3.8790E−03 | 1.9308E−01 | −6.6504E−01 | 1.0865E+00 | −1.0359E+00 | 5.9310E−01 | −1.9029E−01 | 2.6397E−02 |
| S5 | −9.9720E−02 | 1.3217E−01 | −4.6091E−01 | 1.2806E+00 | −3.1063E+00 | 4.9062E+00 | −4.6678E+00 | 2.4392E+00 | −5.4085E−01 |
| S6 | −3.5958E−01 | 1.3920E+00 | −4.1925E+00 | 9.7736E+00 | −1.7424E+01 | 2.1779E+01 | −1.7568E+01 | 8.1317E+00 | −1.6330E+00 |
| S7 | −3.2313E−01 | 1.1847E+00 | −3.2717E+00 | 7.1368E+00 | −1.2604E+01 | 1.6341E+01 | −1.4007E+01 | 6.9420E+00 | −1.4939E+00 |
| S8 | −1.6667E−01 | 4.7929E−01 | −9.1699E−01 | 1.2597E+00 | −1.1422E+00 | 6.1308E−01 | −1.4512E−01 | −1.2420E−02 | 9.4170E−03 |
| S9 | −7.5530E−02 | 1.4830E−02 | 8.0720E−03 | −9.1600E−03 | 3.3686E−03 | −1.5000E−04 | −2.0000E−04 | 4.6800E−05 | −3.3000E−06 |
| S10 | −7.7990E−02 | 1.2194E−02 | 1.1224E−02 | −1.5440E−02 | 9.3195E−03 | −3.3700E−03 | 7.3300E−04 | −8.7000E−05 | 4.2600E−06 |

In embodiment 4, a total effective focal length f of the imaging lens assembly satisfies f=7.24 mm, an effective focal length f1 of the first lens E1 satisfies f1=2.86 mm, an effective focal length f2 of second lens E2 satisfies f2=−4.25 mm, an effective focal length f3 of third lens E3 satisfies f3=11.87 mm, an effective length f4 of the fourth lens E4 satisfies f4=−4.50 mm, and an effective length f5 of the fifth lens E5 satisfies f5=−316.30 mm. The total track length TTL of the imaging lens assembly satisfies TTL=6.40 mm. Half of a diagonal length ImgH of an effective pixel area on the image plane S13 satisfies ImgH=2.15 mm. Half of a maximal field-of-view angle HFOV of the imaging lens assembly satisfies HFOV=16.1°.

Figure 8A:
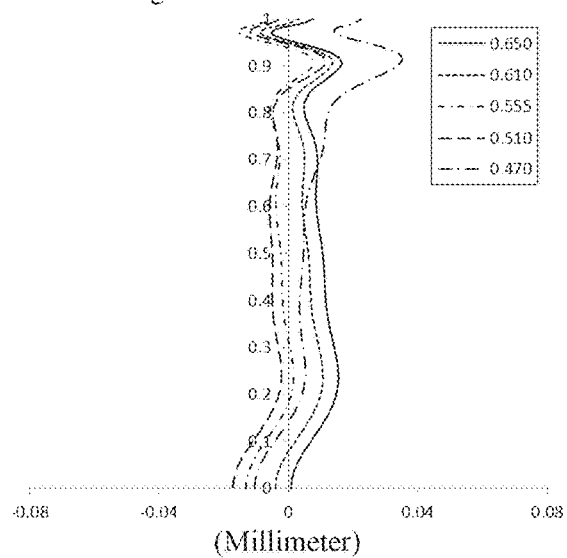
FIGS. 8A to 8D illustrate a longitudinal aberration curve, an astigmatism curve, a distortion curve and a lateral color curve of the imaging lens assembly according to embodiment 4, respectively.
Figure 8B:
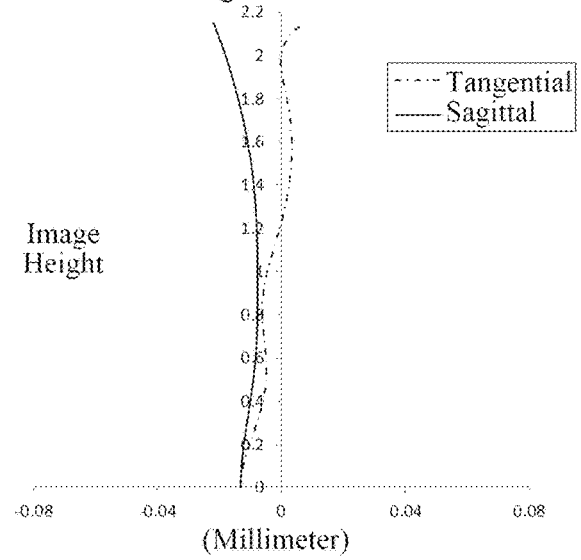
Figure 8C:
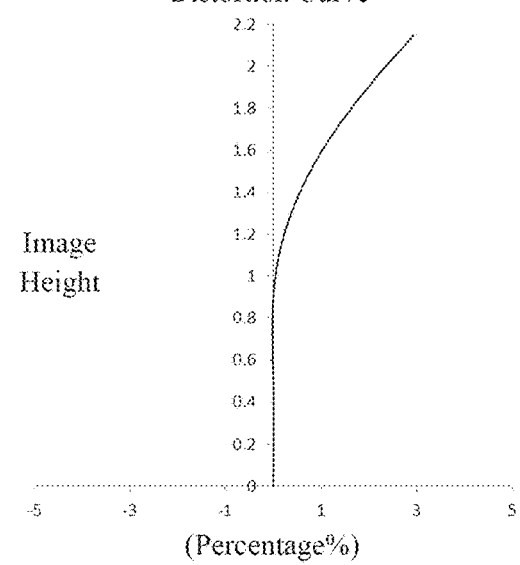
Figure 8D:
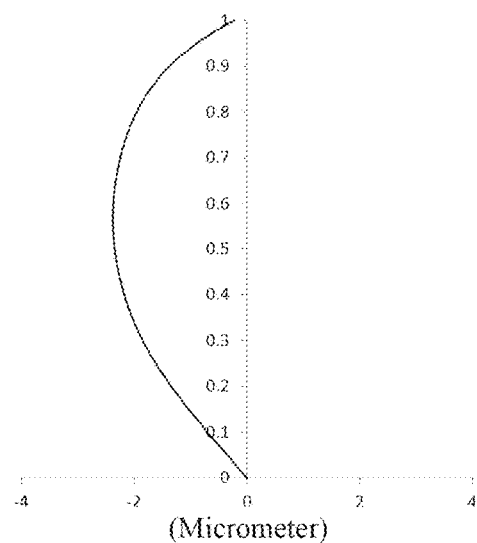

FIG. 8A illustrates a longitudinal aberration curve of the imaging lens assembly according to embodiment 4, representing deviations of focal points converged by light of different wavelengths after passing through the imaging lens assembly. FIG. 8B illustrates an astigmatism curve of the imaging lens assembly according to embodiment 4, representing a curvature of a tangential plane and a curvature of a sagittal plane. FIG. 8C illustrates a distortion curve of the imaging lens assembly according to embodiment 4, representing amounts of distortion at different view angles. FIG. 8D illustrates a lateral color curve of the imaging lens assembly according to embodiment 4, representing deviations of different image heights on an image plane after light passes through the imaging lens assembly. It can be seen from FIG. 8A to FIG. 8D that the imaging lens assembly provided in embodiment 4 may achieve a good imaging quality.

Embodiment 5

Figure 9:
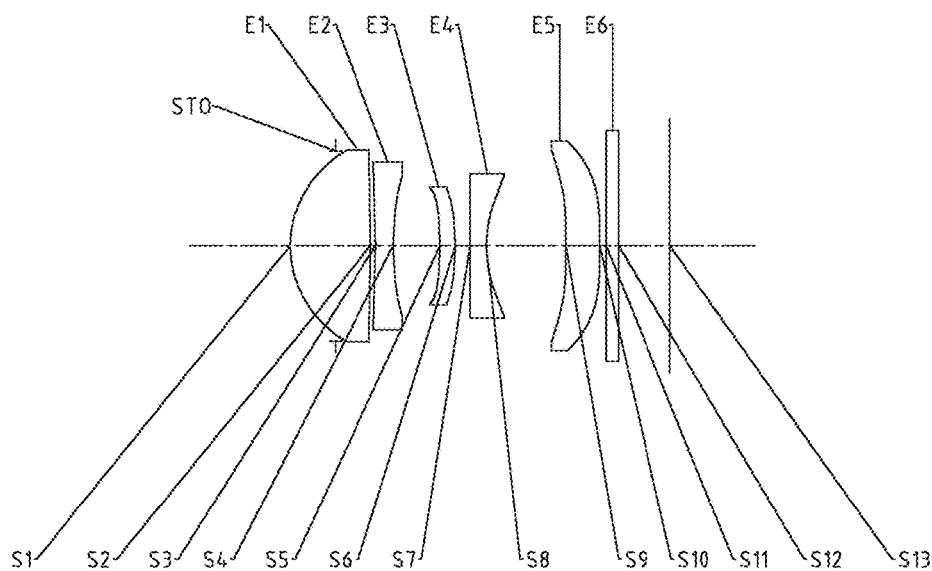
FIG. 9 is a schematic structural view of an imaging lens assembly according to embodiment 5 of the present disclosure.

An imaging lens assembly according to embodiment 5 of the present disclosure is described below with reference to FIG. 9 to FIG. 10D. FIG. 9 is a schematic structural view of the imaging lens assembly according to embodiment 5 of the present disclosure.

As shown in FIG. 9, the imaging lens assembly according to an exemplary implementation of the present disclosure includes, sequentially from an object side to an image side along an optical axis, a first lens E1, a second lens E2, a third lens E3, a fourth lens E4, a fifth lens E5 and an image plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a concave surface, and an image-side surface S10 thereof is a convex surface.

Alternatively, the imaging lens assembly may further include an optical filter E6 having an object-side surface S11 and an image-side surface S12. Light from the object sequentially passes through the respective surfaces S1 to S12 and is finally imaged on the image plane S13.

Alternatively, the imaging lens assembly may further include a diaphragm STO disposed between the object side and the first lens E1 to improve the imaging quality of the lens assembly.

Table 9 shows the surface type, radius of curvature, thickness, material and conic coefficient of each lens of the imaging lens assembly in embodiment 5, wherein the units for the radius of curvature and the thickness are millimeter (mm).

TABLE 9

| Surface number | Surface type | Radius of curvature | Thickness | Material Refractive index | Abbe number | Conic coefficient |
| --- | --- | --- | --- | --- | --- | --- |
| OBJ | spherical | infinite | infinite | | | |
| STO | spherical | infinite | −0.7630 | | | |
| S1 | aspheric | 1.8185 | 1.3597 | 1.54 | 55.7 | −0.3018 |
| S2 | aspheric | −24.2418 | 0.0814 | | | 82.3317 |
| S3 | aspheric | −16.2299 | 0.2974 | 1.67 | 20.4 | −17.3370 |
| S4 | aspheric | 4.9327 | 0.7880 | | | −38.6253 |
| S5 | aspheric | −8.7966 | 0.2600 | 1.65 | 23.5 | −33.9928 |
| S6 | aspheric | −4.1908 | 0.2472 | | | −99.0000 |
| S7 | aspheric | 11.7642 | 0.2700 | 1.55 | 56.1 | 79.2086 |
| S8 | aspheric | 1.8649 | 1.3410 | | | −3.5230 |
| S9 | aspheric | −100.0000 | 0.5666 | 1.65 | 23.5 | −99.0000 |
| S10 | aspheric | −100.0000 | 0.1092 | | | 99.0000 |
| S11 | spherical | infinite | 0.2100 | 1.52 | 64.2 | |
| S12 | spherical | infinite | 0.8694 | | | |
| S13 | spherical | infinite | | | | |

As can be seen from Table 9, in embodiment 5, the object-side surface and the image-side surface of any one of the first lens E1 to the fifth lens E5 are aspheric. Table 10 shows high-order coefficients applicable to each aspheric surface in embodiment 5, wherein the surface shape of each aspheric surface may be defined by the formula (1) given in the above embodiment 1.

TABLE 10

| Surface number | A4 | A6 | A8 | A10 | A12 | A14 | A16 | A18 | A20 |
| --- | --- | --- | --- | --- | --- | --- | --- | --- | --- |
| S1 | 6.5800E−03 | −8.6300E−03 | 2.0416E−02 | −2.2200E−02 | 1.3495E−02 | −3.6600E−03 | −2.0000E−04 | 3.4613E−04 | −5.6761E−05 |
| S2 | −4.2170E−02 | 8.2233E−02 | −7.8624E−02 | 8.9707E−02 | −1.1128E−01 | 9.1843E−02 | −4.3210E−02 | 1.0582E−02 | −1.0486E−03 |
| S3 | −6.0740E−02 | 1.0453E−01 | −5.6293E−02 | −1.5800E−03 | −6.3600E−03 | 3.3124E−02 | −2.6970E−02 | 8.9004E−03 | −1.0768E−03 |
| S4 | 1.2450E−02 | 7.4364E−02 | −2.5424E−01 | 6.5454E−01 | −1.1227E+00 | 1.1891E+00 | −7.4585E−01 | 2.5465E−01 | −3.6547E−02 |
| S5 | −6.2130E−02 | 1.0110E−03 | −1.1769E−01 | 2.7641E−01 | −9.4559E−01 | 1.8066E+00 | −1.8298E+00 | 9.6642E−01 | −2.1496E−01 |
| S6 | −1.8077E−01 | 5.6106E−01 | −1.6934E+00 | 3.9771E+00 | −7.4135E+00 | 9.6446E+00 | −7.8889E+00 | 3.6152E+00 | −7.0759E−01 |
| S7 | −1.7110E−01 | 4.5653E−01 | −8.7121E−01 | 1.3028E+00 | −1.8780E+00 | 2.3175E+00 | −1.9599E+00 | 9.4202E−01 | −1.9349E−01 |
| S8 | −1.3917E−01 | 4.2607E−01 | −8.2220E−01 | 1.3803E+00 | −1.9518E+00 | 2.0716E+00 | −1.4572E+00 | 5.8787E−01 | −1.0194E−01 |
| S9 | −7.6380E−02 | 2.4831E−02 | −1.2224E−02 | 1.4395E−02 | −1.3180E−02 | 7.0810E−03 | −2.0800E−03 | 3.0918E−04 | −1.8332E−05 |
| S10 | −8.5760E−02 | 1.9738E−02 | −2.9700E−03 | −2.0400E−03 | 1.8850E−03 | −8.4000E−04 | 2.1800E−04 | −2.7842E−05 | 1.3392E−06 |

In embodiment 5, a total effective focal length f of the imaging lens assembly satisfies f=7.32 mm, an effective focal length f1 of the first lens E1 satisfies f1=3.21 mm, an effective focal length f2 of second lens E2 satisfies f2=−5.65 mm, an effective focal length f3 of third lens E3 satisfies f3=12.17 mm, an effective length f4 of the fourth lens E4 satisfies f4=−4.10 mm, and an effective length f5 of the fifth lens E5 satisfies f5=70049.70 mm. The total track length TTL of the imaging lens assembly satisfies TTL=6.40 mm. Half of a diagonal length ImgH of an effective pixel area on the image plane S13 satisfies ImgH=2.15 mm. Half of a maximal field-of-view angle HFOV of the imaging lens assembly satisfies HFOV=16.1°.

Figures 10A, 10B:
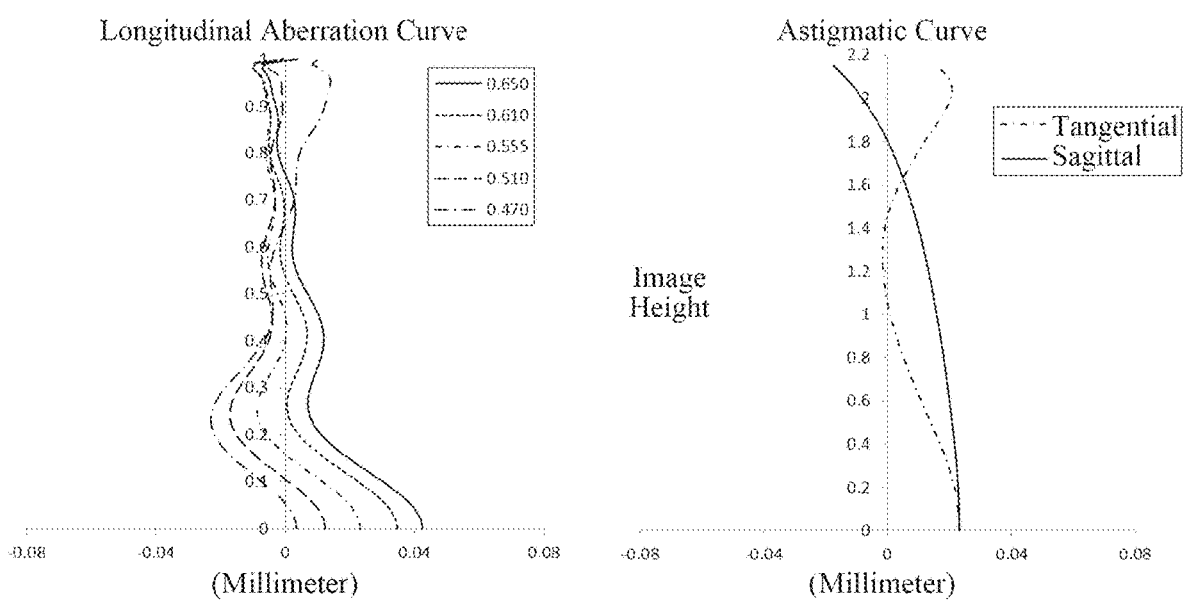
FIGS. 10A to 10D illustrate a longitudinal aberration curve, an astigmatism curve, a distortion curve and a lateral color curve of the imaging lens assembly according to embodiment 5, respectively.
Figures 10C, 10D:
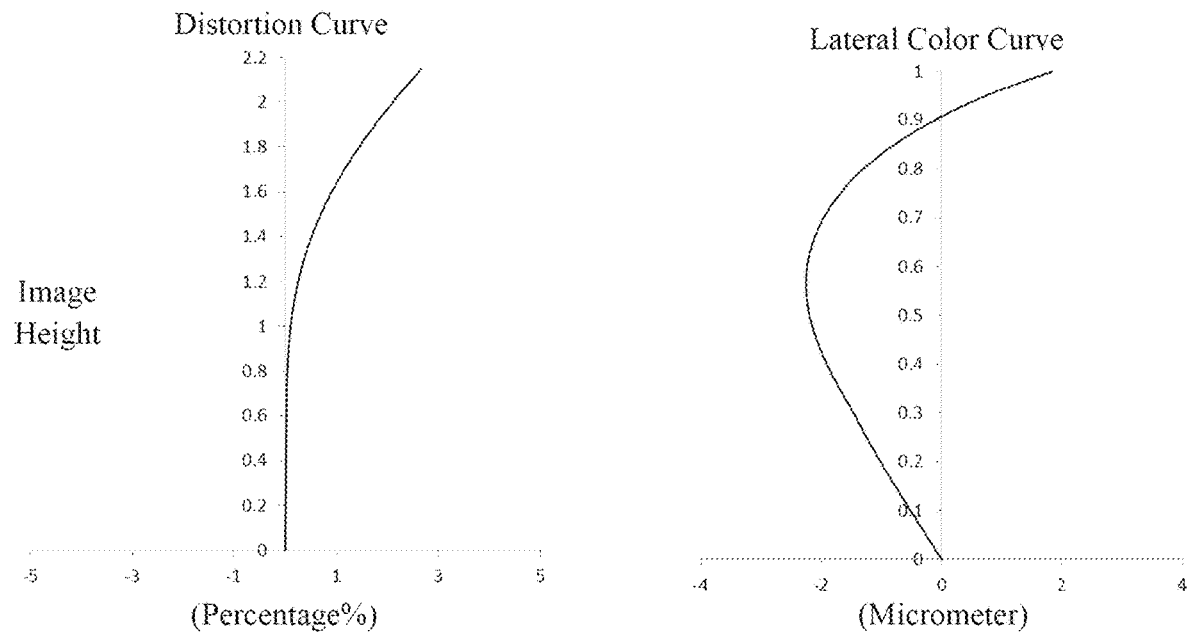

FIG. 10A illustrates a longitudinal aberration curve of the imaging lens assembly according to embodiment 5, representing deviations of focal points converged by light of different wavelengths after passing through the imaging lens assembly. FIG. 10B illustrates an astigmatism curve of the imaging lens assembly according to embodiment 5, representing a curvature of a tangential plane and a curvature of a sagittal plane. FIG. 10C illustrates a distortion curve of the imaging lens assembly according to embodiment 5, representing amounts of distortion at different view angles. FIG. 10D illustrates a lateral color curve of the imaging lens assembly according to embodiment 5, representing deviations of different image heights on an image plane after light passes through the imaging lens assembly. It can be seen from FIG. 10A to FIG. 10D that the imaging lens assembly provided in embodiment 5 may achieve a good imaging quality.

Embodiment 6

Figure 11:
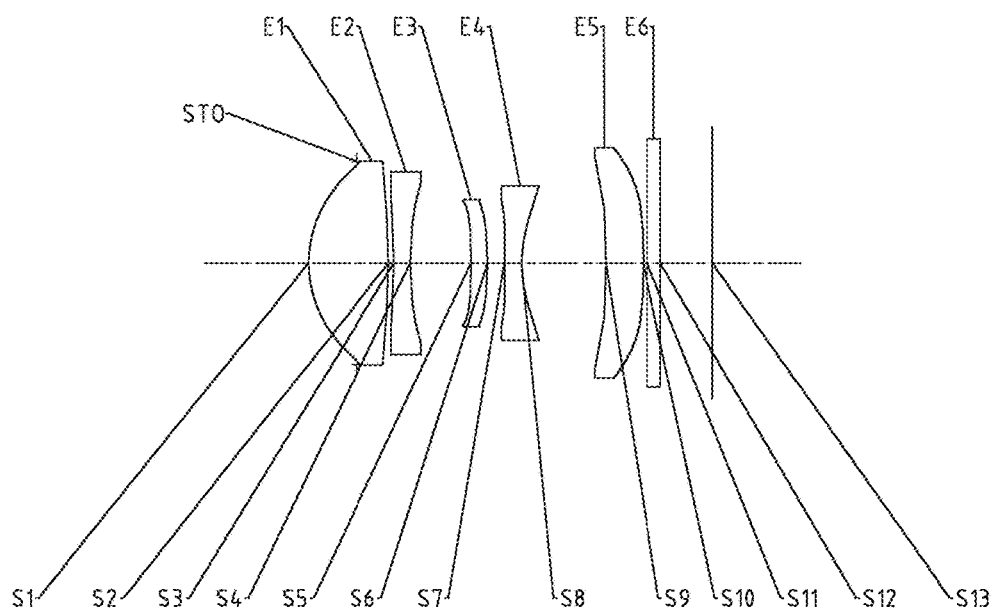
FIG. 11 is a schematic structural view of an imaging lens assembly according to embodiment 6 of the present disclosure.

An imaging lens assembly according to embodiment 6 of the present disclosure is described below with reference to FIG. 11 to FIG. 12D. FIG. 11 is a schematic structural view of the imaging lens assembly according to embodiment 6 of the present disclosure.

As shown in FIG. 11, the imaging lens assembly according to an exemplary implementation of the present disclosure includes, sequentially from an object side to an image side along an optical axis, a first lens E1, a second lens E2, a third lens E3, a fourth lens E4, a fifth lens E5 and an image plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a concave surface, and an image-side surface S10 thereof is a convex surface.

Alternatively, the imaging lens assembly may further include an optical filter E6 having an object-side surface S11 and an image-side surface S12. Light from the object sequentially passes through the respective surfaces S1 to S12 and is finally imaged on the image plane S13.

Alternatively, the imaging lens assembly may further include a diaphragm STO disposed between the object side and the first lens E1 to improve the imaging quality of the lens assembly.

Table 11 shows the surface type, radius of curvature, thickness, material and conic coefficient of each lens of the imaging lens assembly in embodiment 6, wherein the units for the radius of curvature and the thickness are millimeter (mm).

TABLE 11

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.7630 | | | |
| S1 | aspheric | 1.8612 | 1.2645 | 1.54 | 55.7 | −0.3751 |
| S2 | aspheric | −17.7079 | 0.0876 | | | 99.0000 |
| S3 | aspheric | −14.7675 | 0.2600 | 1.67 | 20.4 | −5.4421 |
| S4 | aspheric | 5.3822 | 0.9593 | | | −48.2018 |
| S5 | aspheric | −17.0204 | 0.2600 | 1.65 | 23.5 | −99.0000 |
| S6 | aspheric | −5.2576 | 0.2665 | | | −99.0000 |
| S7 | aspheric | 12.5284 | 0.2700 | 1.55 | 56.1 | −68.0299 |
| S8 | aspheric | 1.8027 | 1.3331 | | | −4.3891 |
| S9 | aspheric | −100.0000 | 0.5914 | 1.65 | 23.5 | −99.0000 |
| S10 | aspheric | −100.0000 | 0.0638 | | | −99.0000 |
| S11 | spherical | infinite | 0.2100 | 1.52 | 64.2 | |
| S12 | spherical | infinite | 0.8239 | | | |
| S13 | spherical | infinite | | | | |

As can be seen from Table 11, in embodiment 6, the object-side surface and the image-side surface of any one of the first lens E1 to the fifth lens E5 are aspheric. Table 12 shows high-order coefficients applicable to each aspheric surface in embodiment 6, wherein the surface shape of each aspheric surface may be defined by the formula (1) given in the above embodiment 1.

TABLE 12

| Surface number | A4 | A6 | A8 | A10 | A12 | A14 | A16 | A18 | A20 |
|---|---|---|---|---|---|---|---|---|---|
| S1 | 5.4400E−03 | −4.5219E−03 | 1.1667E−02 | −1.2060E−02 | 6.2690E−03 | −6.5000E−04 | −8.9000E−04 | 4.1700E−04 | −5.9685E−05 |
| S2 | −8.0780E−02 | 2.1485E−01 | −3.2263E−01 | 3.5881E−01 | −2.8845E−01 | 1.5595E−01 | −5.2640E−02 | 9.8970E−03 | −7.8524E−04 |
| S3 | −1.1351E−01 | 3.2532E−01 | −5.2622E−01 | 6.1631E−01 | −5.2088E−01 | 2.9910E−01 | −1.0776E−01 | 2.1609E−02 | −1.8108E−03 |
| S4 | −9.5400E−03 | 1.6470E−01 | −4.1406E−01 | 7.1880E−01 | −8.6800E−01 | 6.8413E−01 | −3.2693E−01 | 8.4523E−02 | −8.8731E−03 |
| S5 | −3.9980E−02 | 3.1766E−02 | −3.8326E−01 | 1.1310E+00 | −2.6309E+00 | 3.9222E+00 | −3.4681E+00 | 1.6669E+00 | −3.3517E−01 |
| S6 | −7.1110E−02 | 2.5925E−01 | −1.1130E+00 | 2.9917E+00 | −6.0966E+00 | 8.3280E+00 | −6.9721E+00 | 3.2219E+00 | −6.2826E−01 |
| S7 | −1.2804E−01 | 3.4078E−01 | −1.1720E+00 | 3.1525E+00 | −6.5670E+00 | 9.2670E+00 | −8.1316E+00 | 3.9851E+00 | −8.3201E−01 |
| S8 | −8.7690E−02 | 2.8258E−01 | −6.8806E−01 | 1.4265E+00 | −2.3533E+00 | 2.7343E+00 | −2.0237E+00 | 8.4538E−01 | −1.5091E−01 |
| S9 | −5.9420E−02 | 1.3095E−02 | 2.4672E−02 | −4.0090E−02 | 3.1884E−02 | −1.4760E−02 | 3.9480E−03 | −5.6000E−04 | 3.2412E−05 |
| S10 | −7.5520E−02 | 1.5869E−02 | 2.8080E−03 | −3.5700E−03 | −7.9016E−04 | 1.9060E−03 | −8.7000E−04 | 1.6900E−04 | −1.2177E−05 |

In embodiment 6, a total effective focal length f of the imaging lens assembly satisfies f=7.31 mm, an effective focal length f1 of the first lens E1 satisfies f1=3.21 mm, an effective focal length f2 of second lens E2 satisfies f2=−5.89 mm, an effective focal length f3 of third lens E3 satisfies f3=11.72 mm, an effective length f4 of the fourth lens E4 satisfies f4=−3.89 mm, and an effective length f5 of the fifth lens E5 satisfies f5=67120.11 mm. The total track length TTL of the imaging lens assembly satisfies TTL=6.39 mm. Half of a diagonal length ImgH of an effective pixel area on the image plane S13 satisfies ImgH=2.15 mm. Half of a maximal field-of-view angle HFOV of the imaging lens assembly satisfies HFOV=16.1°.

Figure 12A:
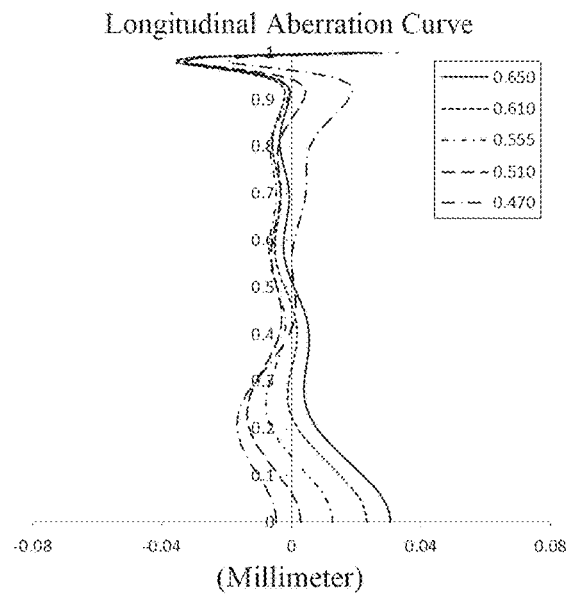
FIGS. 12A to 12D illustrate a longitudinal aberration curve, an astigmatism curve, a distortion curve and a lateral color curve of the imaging lens assembly according to embodiment 6, respectively.
Figure 12B:
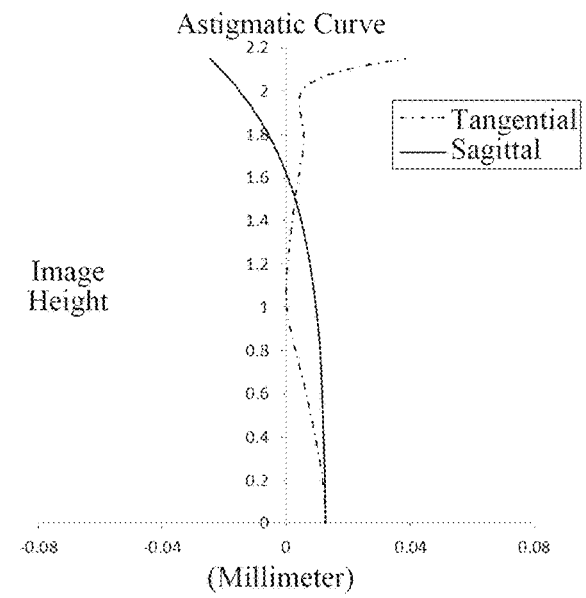
Figure 12C:
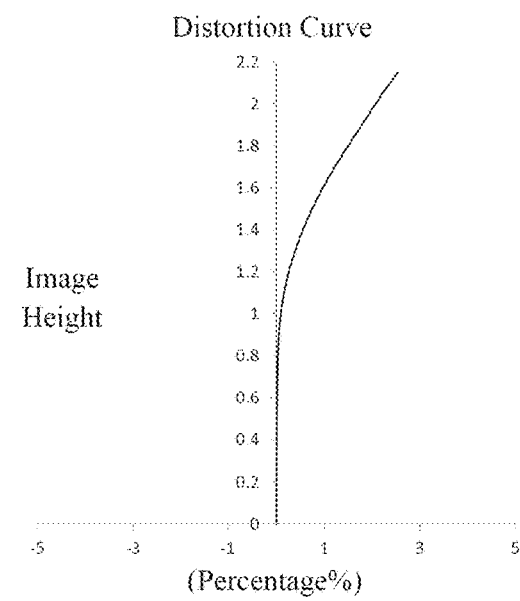
Figure 12D:
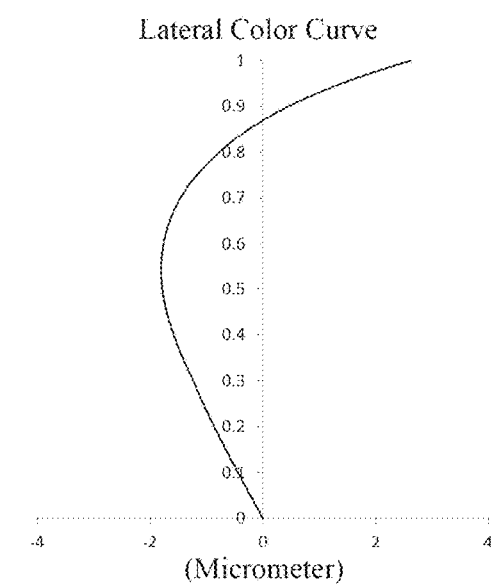

FIG. 12A illustrates a longitudinal aberration curve of the imaging lens assembly according to embodiment 6, representing deviations of focal points converged by light of different wavelengths after passing through the imaging lens assembly. FIG. 12B illustrates an astigmatism curve of the imaging lens assembly according to embodiment 6, representing a curvature of a tangential plane and a curvature of a sagittal plane. FIG. 12C illustrates a distortion curve of the imaging lens assembly according to embodiment 6, representing amounts of distortion at different view angles. FIG. 12D illustrates a lateral color curve of the imaging lens assembly according to embodiment 6, representing deviations of different image heights on an image plane after light passes through the imaging lens assembly. It can be seen from FIG. 12A to FIG. 12D that the imaging lens assembly provided in embodiment 6 may achieve a good imaging quality.

Embodiment 7

An imaging lens assembly according to embodiment 7 of the present disclosure is described below with reference to FIG. 13 to FIG. 14D. FIG. 13 is a schematic structural view of the imaging lens assembly according to embodiment 7 of the present disclosure.

As shown in FIG. 13, the imaging lens assembly according to an exemplary implementation of the present disclosure includes, sequentially from an object side to an image side along an optical axis, a first lens E1, a second lens E2, a third lens E3, a fourth lens E4, a fifth lens E5 and an image plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a concave surface, and an image-side surface S10 thereof is a convex surface.

Alternatively, the imaging lens assembly may further include an optical filter E6 having an object-side surface S11 and an image-side surface S12. Light from the object sequentially passes through the respective surfaces S1 to S12 and is finally imaged on the image plane S13.

Alternatively, the imaging lens assembly may further include a diaphragm STO disposed between the object side and the first lens E1 to improve the imaging quality of the lens assembly.

Table 13 shows the surface type, radius of curvature, thickness, material and conic coefficient of each lens of the imaging lens assembly in embodiment 7, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.7630 | | | |
| S1 | aspheric | 1.8591 | 1.2570 | 1.54 | 55.7 | −0.3849 |
| S2 | aspheric | −17.9765 | 0.1861 | | | 99.0000 |
| S3 | aspheric | −16.2959 | 0.2600 | 1.67 | 20.4 | 20.4152 |
| S4 | aspheric | 4.0053 | 0.9062 | | | −34.7558 |
| S5 | aspheric | −76.7892 | 0.2679 | 1.65 | 23.5 | 99.0000 |
| S6 | aspheric | −5.3592 | 0.3728 | | | −70.0990 |
| S7 | aspheric | 91.3459 | 0.2700 | 1.55 | 56.1 | −34.7324 |
| S8 | aspheric | 2.1240 | 1.2612 | | | −5.0000 |
| S9 | aspheric | −100.0000 | 0.5789 | 1.65 | 23.5 | −99.0000 |
| S10 | aspheric | −100.0000 | 0.0300 | | | 99.0000 |
| S11 | spherical | infinite | 0.2100 | 1.52 | 64.2 | |
| S12 | spherical | infinite | 0.7900 | | | |
| S13 | spherical | infinite | | | | |

As can be seen from Table 13, in embodiment 7, the object-side surface and the image-side surface of any one of the first lens E1 to the fifth lens E5 are aspheric. Table 4 shows high-order coefficients applicable to each aspheric surface in embodiment 2, wherein the surface shape of each aspheric surface may be defined by the formula (1) given in the above embodiment 1.

TABLE 14

| Surface number | A4 | A6 | A8 | A10 | A12 | A14 | A16 | A18 | A20 |
|---|---|---|---|---|---|---|---|---|---|
| S1 | 5.6390E−03 | −7.2600E−03 | 1.9167E−02 | −2.4190E−02 | 1.8396E−02 | −8.3200E−03 | 2.1040E−03 | −2.5000E−04 | 4.8800E−06 |
| S2 | −4.3220E−02 | 1.0205E−01 | −1.2552E−01 | 1.1807E−01 | −8.5154E−02 | 4.2530E−02 | −1.3350E−02 | 2.3250E−03 | −1.7000E−04 |
| S3 | −1.1041E−01 | 2.8836E−01 | −4.2568E−01 | 4.7040E−01 | −4.0245E−01 | 2.4944E−01 | −1.0098E−01 | 2.3398E−02 | −2.3300E−03 |
| S4 | −1.3590E−02 | 2.1409E−01 | −5.6802E−01 | 1.1330E+00 | −1.6333E+00 | 1.5547E+00 | −9.0983E−01 | 2.9590E−01 | −4.1000E−02 |
| S5 | −1.8040E−02 | −8.6370E−02 | 2.2982E−01 | −1.3021E+00 | 3.1009E+00 | −4.3760E+00 | 3.7329E+00 | −1.7523E+00 | 3.4310E−01 |
| S6 | −1.0190E−02 | −4.0450E−02 | 1.7128E−02 | −7.0956E−01 | 1.9806E+00 | −2.8336E+00 | 2.4295E+00 | −1.1760E+00 | 2.4505E−01 |
| S7 | −4.3870E−02 | 1.0163E−02 | −4.8495E−01 | 1.7566E+00 | −4.0462E+00 | 6.0498E+00 | −5.4681E+00 | 2.7049E+00 | −5.6453E−01 |
| S8 | −2.3120E−02 | 1.2133E−02 | −1.2298E−01 | 3.7725E−01 | −6.7935E−01 | 8.3168E−01 | −6.4025E−01 | 2.7167E−01 | −4.8200E−02 |
| S9 | −5.3840E−02 | 3.4079E−02 | −3.4031E−02 | 3.0829E−02 | −1.9290E−02 | 7.6970E−03 | −1.8000E−03 | 2.2200E−04 | −1.1000E−05 |
| S10 | −7.3400E−02 | 2.8454E−02 | −1.8990E−02 | 1.0514E−02 | −4.1857E−03 | 1.1820E−03 | −2.5000E−04 | 3.8100E−05 | −2.9000E−06 |

In embodiment 7, a total effective focal length f of the imaging lens assembly satisfies f=7.31 mm, an effective focal length f1 of the first lens E1 satisfies f1=3.21 mm, an effective focal length f2 of second lens E2 satisfies f2=−4.80 mm, an effective focal length f3 of third lens E3 satisfies f3=8.94 mm, an effective length f4 of the fourth lens E4 satisfies f4=−3.99 mm, and an effective length f5 of the fifth lens E5 satisfies f5=68561.24 mm. The total track length TTL of the imaging lens assembly satisfies TTL=6.39 mm. Half of a diagonal length ImgH of an effective pixel area on the image plane S13 satisfies ImgH=2.15 mm. Half of a maximal field-of-view angle HFOV of the imaging lens assembly satisfies HFOV=16.0°.

Figures 14C, 14D:
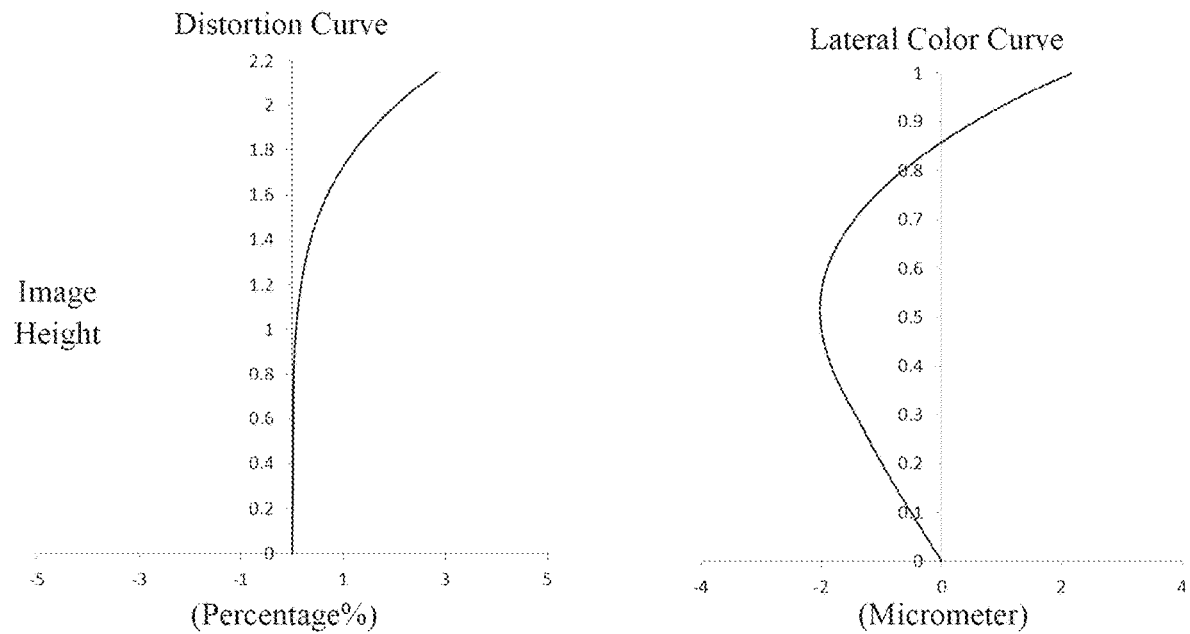

FIG. 14A illustrates a longitudinal aberration curve of the imaging lens assembly according to embodiment 7, representing deviations of focal points converged by light of different wavelengths after passing through the imaging lens assembly. FIG. 14B illustrates an astigmatism curve of the imaging lens assembly according to embodiment 7, representing a curvature of a tangential plane and a curvature of a sagittal plane. FIG. 14C illustrates a distortion curve of the imaging lens assembly according to embodiment 7, representing amounts of distortion at different view angles. FIG. 14D illustrates a lateral color curve of the imaging lens assembly according to embodiment 7, representing deviations of different image heights on an image plane after light passes through the imaging lens assembly. It can be seen from FIG. 14A to FIG. 14D that the imaging lens assembly provided in embodiment 7 may achieve a good imaging quality.

Embodiment 8

Figure 15:
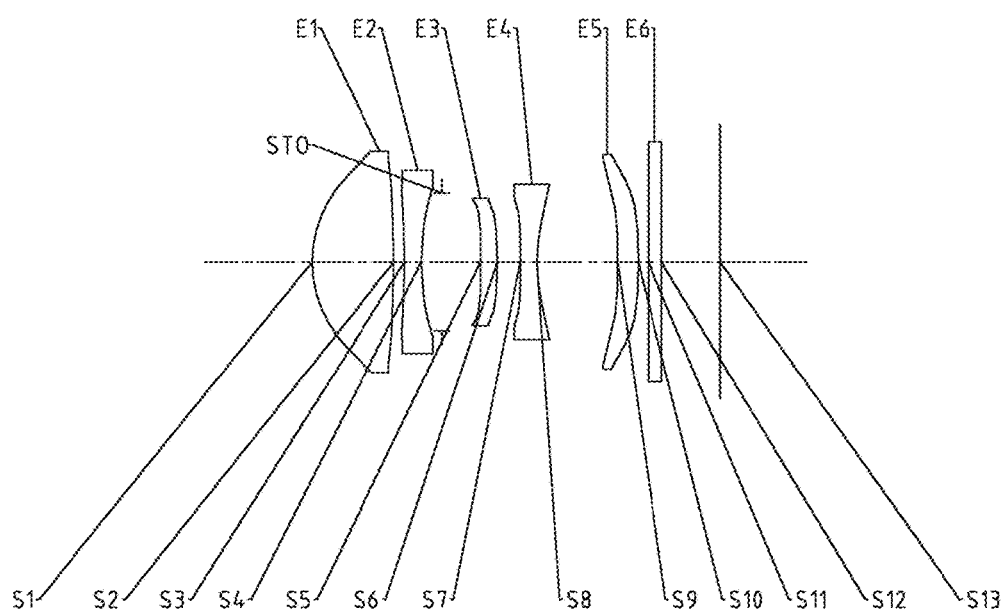
FIG. 15 is a schematic structural view of an imaging lens assembly according to embodiment 8 of the present disclosure.

An imaging lens assembly according to embodiment 8 of the present disclosure is described below with reference to FIG. 15 to FIG. 16D. FIG. 15 is a schematic structural view of the imaging lens assembly according to embodiment 8 of the present disclosure.

As shown in FIG. 15, the imaging lens assembly according to an exemplary implementation of the present disclosure includes, sequentially from an object side to an image side along an optical axis, a first lens E1, a second lens E2, a third lens E3, a fourth lens E4, a fifth lens E5 and an image plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a convex surface, and an image-side surface S6 thereof is a convex surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a concave surface, and an image-side surface S10 thereof is a convex surface.

Alternatively, the imaging lens assembly may further include an optical filter E6 having an object-side surface S11 and an image-side surface S12. Light from the object sequentially passes through the respective surfaces S1 to S12 and is finally imaged on the image plane S13.

Alternatively, the imaging lens assembly may further include a diaphragm STO disposed between the second lens E2 and the third lens E3 to improve the imaging quality of the lens assembly.

Table 15 shows the surface type, radius of curvature, thickness, material and conic coefficient of each lens of the imaging lens assembly in embodiment 8, wherein the units for the radius of curvature and the thickness are millimeter (mm).

TABLE 15

| Surface number | Surface type | Radius of curvature | Thickness | Refractive index | Abbe number | Conic coefficient |
|---|---|---|---|---|---|---|
| OBJ | spherical | infinite | infinite | | | |
| S1 | aspheric | 1.8816 | 1.2836 | 1.54 | 56.0 | −0.3924 |
| S2 | aspheric | −19.3573 | 0.1693 | | | 99.0000 |

TABLE 15-continued

| Surface number | Surface type | Radius of curvature | Thickness | Material Refractive index | Abbe number | Conic coefficient |
|---|---|---|---|---|---|---|
| S3 | aspheric | −17.3875 | 0.2600 | 1.67 | 20.4 | 17.5786 |
| S4 | aspheric | 3.7430 | 0.3246 | | | −33.6343 |
| STO | spherical | infinite | 0.6000 | | | |
| S5 | aspheric | 1232.7920 | 0.2650 | 1.65 | 23.5 | −99.0000 |
| S6 | aspheric | −6.1675 | 0.3567 | | | −75.0296 |
| S7 | aspheric | 90.3886 | 0.2600 | 1.52 | 70.4 | −99.0000 |
| S8 | aspheric | 2.3558 | 1.2625 | | | −5.3118 |
| S9 | aspheric | −100.0000 | 0.3215 | 1.65 | 23.5 | 0.0000 |
| S10 | aspheric | −100.0000 | 0.1584 | | | −305132.0000 |
| S11 | spherical | infinite | 0.2100 | 1.52 | 64.2 | |
| S12 | spherical | infinite | 0.9184 | | | |
| S13 | spherical | infinite | | | | |

As can be seen from Table 15, in embodiment 8, the object-side surface and the image-side surface of any one of the first lens E1 to the fifth lens E5 are aspheric. Table 16 shows high-order coefficients applicable to each aspheric surface in embodiment 8, wherein the surface shape of each aspheric surface may be defined by the formula (1) given in the above embodiment 1.

TABLE 16

| Surface number | A4 | A6 | A8 | A10 | A12 | A14 | A16 | A18 | A20 |
|---|---|---|---|---|---|---|---|---|---|
| S1 | 2.7660E−03 | 5.1192E−03 | −9.3241E−03 | 1.4478E−02 | −1.4300E−02 | 8.9430E−03 | −3.4000E−03 | 7.1500E−04 | −6.4000E−05 |
| S2 | −5.3950E−02 | 1.5218E−01 | −2.2997E−01 | 2.4446E−01 | −1.7982E−01 | 8.6529E−02 | −2.5580E−02 | 4.1740E−03 | −2.9000E−04 |
| S3 | −1.3293E−01 | 4.0534E−01 | −7.2350E−01 | 9.1052E−01 | −7.9857E−01 | 4.6673E−01 | −1.7033E−01 | 3.4755E−02 | −3.0000E−03 |
| S4 | −1.3050E−02 | 2.1671E−01 | −4.7848E−01 | 6.1579E−01 | −4.1511E−01 | 6.2650E−03 | 2.0597E−01 | −1.3386E−01 | 2.7842E−02 |
| S5 | −1.8940E−02 | −1.0422E−01 | 4.6469E−01 | −2.6667E+00 | 7.1725E+00 | −1.1500E+01 | 1.1077E+01 | −5.8646E+00 | 1.3083E+00 |
| S6 | 3.3110E−03 | −5.2655E−02 | 2.8464E−02 | −7.9447E−01 | 2.0166E+00 | −2.5217E+00 | 1.8458E+00 | −7.5522E−01 | 1.3297E−01 |
| S7 | −7.0140E−02 | 1.2012E−01 | −7.7015E−01 | 2.2210E+00 | −4.6292E+00 | 6.5185E+00 | −5.5944E+00 | 2.6342E+00 | −5.2576E−01 |
| S8 | −6.1750E−02 | 1.0772E−01 | −2.8122E−01 | 4.8048E−01 | −5.8509E−01 | 5.6814E−01 | −3.9046E−01 | 1.5463E−01 | −2.5860E−02 |
| S9 | −1.1138E−01 | 6.2945E−02 | −2.9423E−02 | 8.3880E−03 | 1.1840E−03 | −1.5300E−03 | 4.2700E−04 | −5.3000E−05 | 2.5300E−06 |
| S10 | −1.3646E−01 | 8.6412E−02 | −6.7139E−02 | 4.4095E−02 | −2.1630E−02 | 7.6180E−03 | −1.7600E−03 | 2.3500E−04 | −1.4000E−05 |

In embodiment 8, a total effective focal length f of the imaging lens assembly satisfies f=7.27 mm, an effective focal length f1 of the first lens E1 satisfies f1=3.21 mm, an effective focal length f2 of second lens E2 satisfies f2=−4.60 mm, an effective focal length f3 of third lens E3 satisfies f3=9.54 mm, an effective length f4 of the fourth lens E4 satisfies f4=−4.60 mm, and an effective length f5 of the fifth lens E5 satisfies f5=123451.56 mm. The total track length TTL of the imaging lens assembly satisfies TTL=6.39 mm. Half of a diagonal length ImgH of an effective pixel area on the image plane S13 satisfies ImgH=2.15 mm. Half of a maximal field-of-view angle HFOV of the imaging lens assembly satisfies HFOV=16.1°.

Figure 16A:
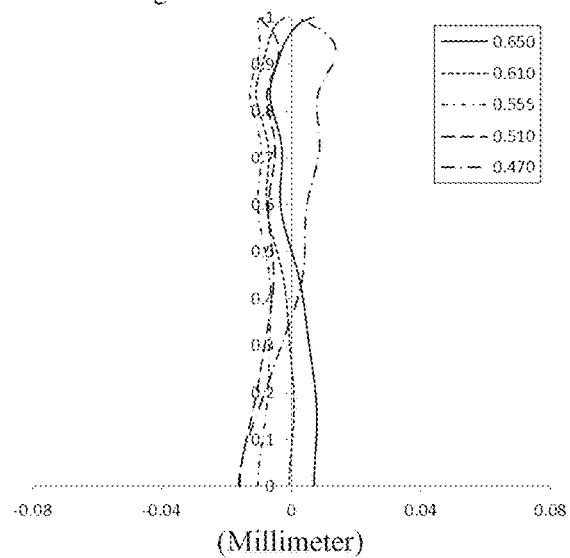
FIGS. 16A to 16D illustrate a longitudinal aberration curve, an astigmatism curve, a distortion curve and a lateral color curve of the imaging lens assembly according to embodiment 8, respectively.
Figure 16B:
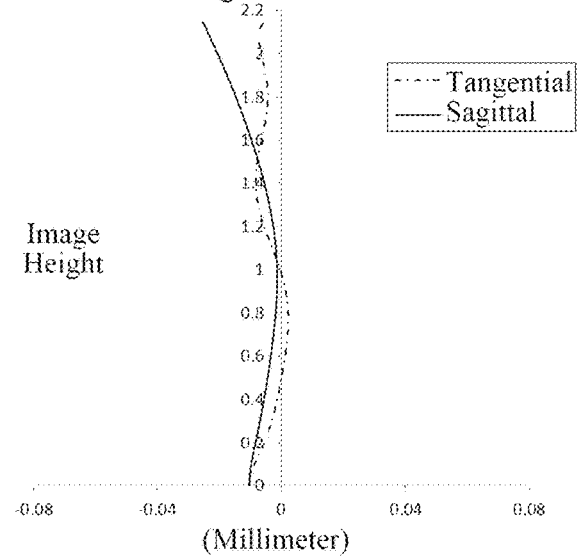
Figure 16C:
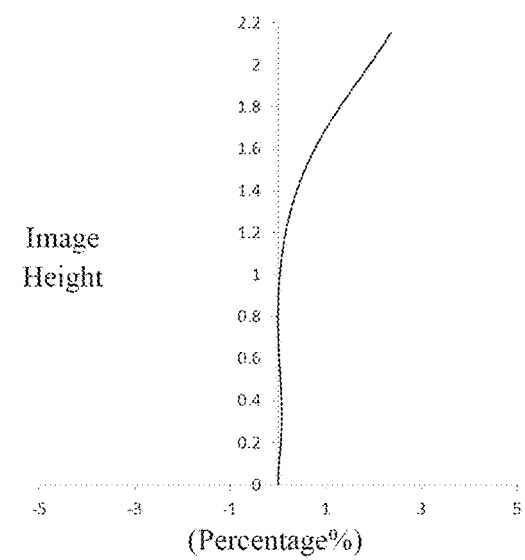
Figure 16D:
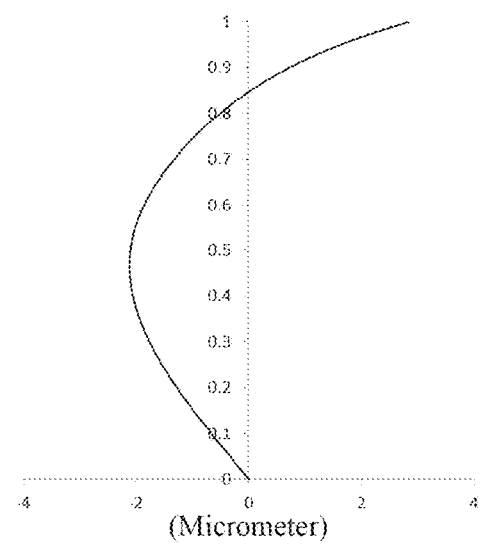

FIG. 16A illustrates a longitudinal aberration curve of the imaging lens assembly according to embodiment 8, representing deviations of focal points converged by light of different wavelengths after passing through the imaging lens assembly. FIG. 16B illustrates an astigmatism curve of the imaging lens assembly according to embodiment 8, representing a curvature of a tangential plane and a curvature of a sagittal plane. FIG. 16C illustrates a distortion curve of the imaging lens assembly according to embodiment 8, representing amounts of distortion at different view angles. FIG. 16D illustrates a lateral color curve of the imaging lens assembly according to embodiment 8, representing deviations of different image heights on an image plane after light passes through the imaging lens assembly. It can be seen from FIG. 16A to FIG. 16D that the imaging lens assembly provided in embodiment 8 may achieve a good imaging quality.

Embodiment 9

Figure 17:
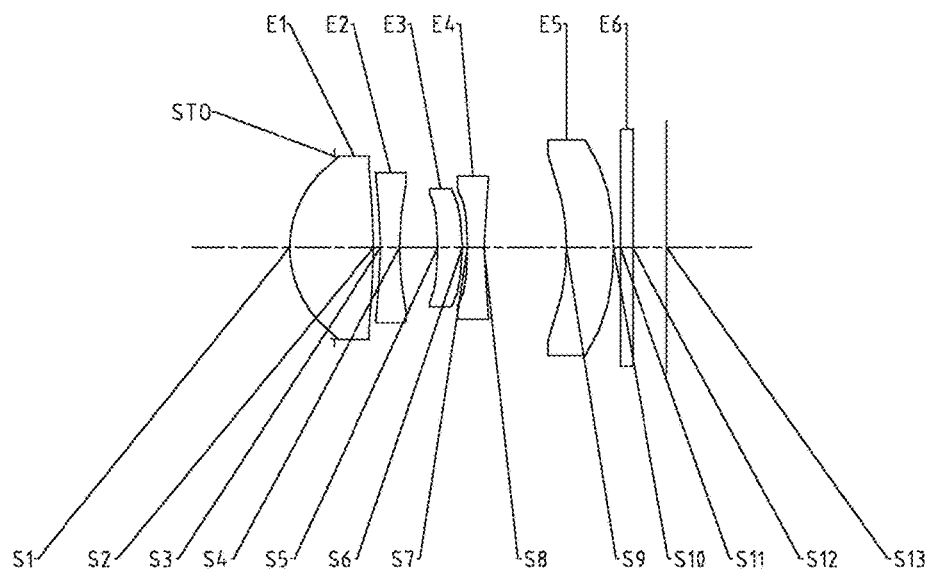
FIG. 17 is a schematic structural view of an imaging lens assembly according to embodiment 9 of the present disclosure.

An imaging lens assembly according to embodiment 9 of the present disclosure is described below with reference to FIG. 17 to FIG. 18D. FIG. 17 is a schematic structural view of the imaging lens assembly according to embodiment 8 of the present disclosure.

As shown in FIG. 17, the imaging lens assembly according to an exemplary implementation of the present disclosure includes, sequentially from an object side to an image side along an optical axis, a first lens E1, a second lens E2, a third lens E3, a fourth lens E4, a fifth lens E5 and an image plane S13.

The first lens E1 has a positive refractive power, and an object-side surface S1 thereof is a convex surface, and an image-side surface S2 thereof is a convex surface. The second lens E2 has a negative refractive power, and an object-side surface S3 thereof is a concave surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a negative refractive power, and an object-side surface S9 thereof is a concave surface, and an image-side surface S10 thereof is a convex surface.

Alternatively, the imaging lens assembly may further include an optical filter E6 having an object-side surface S11 and an image-side surface S12. Light from the object sequentially passes through the respective surfaces S1 to S12 and is finally imaged on the image plane S13.

Alternatively, the imaging lens assembly may further include a diaphragm STO disposed between the object side and the first lens E1 to improve the imaging quality of the lens assembly.

Table 17 shows the surface type, radius of curvature, thickness, material and conic coefficient of each lens of the imaging lens assembly in embodiment 9, wherein the units for the radius of curvature and the thickness are millimeter (mm).

focal length f1 of the first lens E1 satisfies f1=2.86 mm, an effective focal length f2 of second lens E2 satisfies f2=−4.29 mm, an effective focal length f3 of third lens E3 satisfies f3=11.90 mm, an effective length f4 of the fourth lens E4 satisfies f4=−5.42 mm, and an effective length f5 of the fifth lens E5 satisfies f5=−18.97 mm. The total track length TTL of the imaging lens assembly satisfies TTL=6.40 mm. Half of a diagonal length ImgH of an effective pixel area on the image plane S13 satisfies ImgH=2.15 mm. Half of a maximal field-of-view angle HFOV of the imaging lens assembly satisfies HFOV=16.6°.

Figures 18A, 18B:
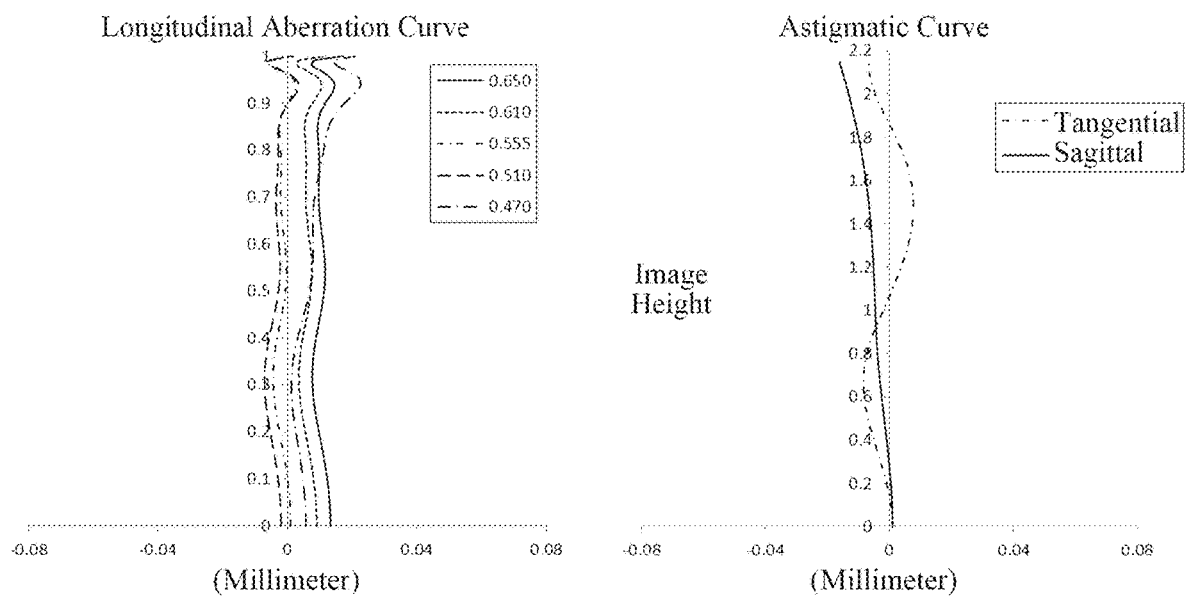
FIGS. 18A to 18D illustrate a longitudinal aberration curve, an astigmatism curve, a distortion curve and a lateral color curve of the imaging lens assembly according to embodiment 9, respectively.
Figures 18C, 18D:
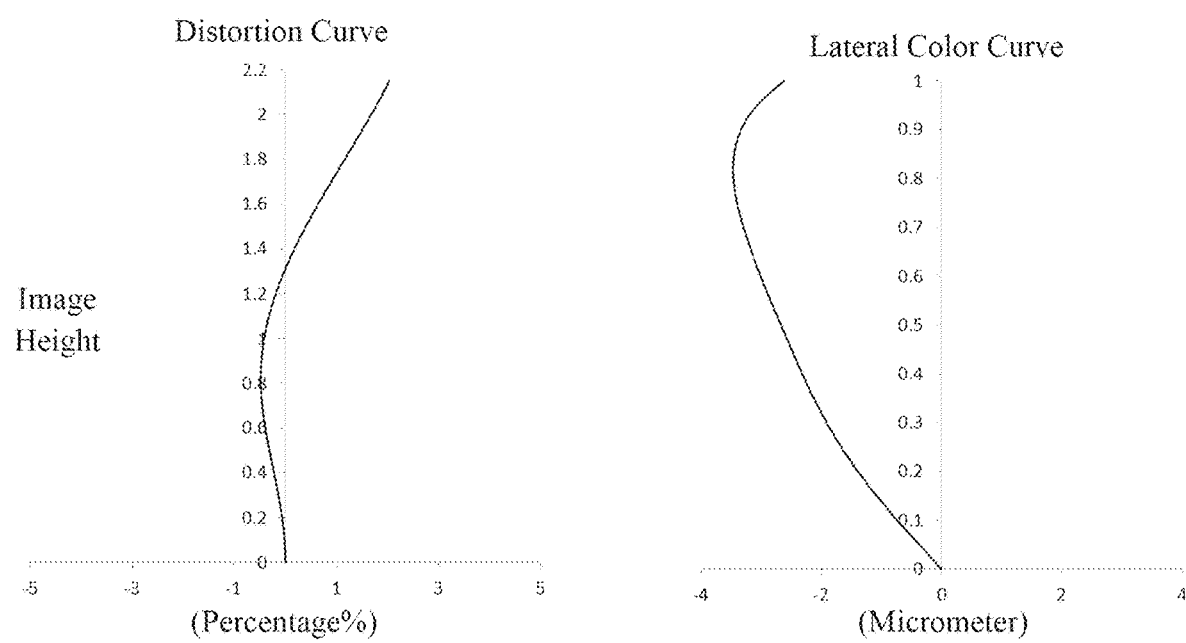

FIG. 18A illustrates a longitudinal aberration curve of the imaging lens assembly according to embodiment 9, representing deviations of focal points converged by light of different wavelengths after passing through the imaging lens assembly. FIG. 18B illustrates an astigmatism curve of the imaging lens assembly according to embodiment 9, representing a curvature of a tangential plane and a curvature of a sagittal plane. FIG. 18C illustrates a distortion curve of the imaging lens assembly according to embodiment 9, representing amounts of distortion at different view angles. FIG.

TABLE 17

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.7630 | | | |
| S1 | aspheric | 1.8050 | 1.4300 | 1.55 | 56.1 | −0.3360 |
| S2 | aspheric | −8.4068 | 0.1211 | | | 17.1393 |
| S3 | aspheric | −6.7341 | 0.3186 | 1.66 | 21.5 | −39.7370 |
| S4 | aspheric | 4.9208 | 0.6457 | | | −56.7434 |
| S5 | aspheric | −5.9132 | 0.4191 | 1.65 | 23.5 | −46.2596 |
| S6 | aspheric | −3.4313 | 0.0863 | | | −81.9934 |
| S7 | aspheric | −8.4667 | 0.2786 | 1.55 | 56.1 | 34.5292 |
| S8 | aspheric | 4.6029 | 1.3947 | | | −21.8149 |
| S9 | aspheric | −4.9304 | 0.7931 | 1.65 | 23.5 | −56.0429 |
| S10 | aspheric | −8.7823 | 0.1211 | | | −49.6885 |
| S11 | spherical | infinite | 0.2100 | 1.52 | 64.2 | |
| S12 | spherical | infinite | 0.5789 | | | |
| S13 | spherical | infinite | | | | |

As can be seen from Table 17, in embodiment 9, the object-side surface and the image-side surface of any one of the first lens E1 to the fifth lens E5 are aspheric. Table 18 shows high-order coefficients applicable to each aspheric surface in embodiment 9, wherein the surface shape of each aspheric surface can be defined by the formula (1) given in the above embodiment 1.

18D illustrates a lateral color curve of the imaging lens assembly according to embodiment 9, representing deviations of different image heights on an image plane after light passes through the imaging lens assembly. It can be seen from FIG. 18A to FIG. 18D that the imaging lens assembly provided in embodiment 9 may achieve a good imaging quality.

TABLE 18

| Surface number | A4 | A6 | A8 | A10 | A12 | A14 | A16 | A18 | A20 |
|---|---|---|---|---|---|---|---|---|---|
| S1 | 4.6670E−03 | 1.5910E−03 | −1.4700E−03 | 2.9800E−03 | −2.4000E−03 | 9.7900E−04 | −1.6000E−04 | 0.0000E+00 | 0.0000E+00 |
| S2 | −1.6900E−03 | 4.9759E−02 | −5.2060E−02 | 2.7932E−02 | −7.6300E−03 | 4.0800E−04 | 1.7600E−04 | 0.0000E+00 | 0.0000E+00 |
| S3 | −5.6870E−02 | 1.3941E−01 | −1.6139E−01 | 1.1219E−01 | −4.5540E−02 | 9.5620E−03 | −6.4000E−04 | 0.0000E+00 | 0.0000E+00 |
| S4 | 1.1505E−02 | 3.2673E−02 | −2.1300E−02 | −4.4510E−02 | 8.0779E−02 | −4.9660E−02 | 1.0965E−02 | 0.0000E+00 | 0.0000E+00 |
| S5 | −8.3580E−02 | −7.3265E−03 | 2.0836E−01 | −1.0057E+00 | 2.2806E+00 | −3.3575E+00 | 3.1432E+00 | −1.6543E+00 | 3.6092E−01 |
| S6 | −3.3606E−01 | 1.2484E+00 | −3.8895E+00 | 9.6484E+00 | −1.8095E+01 | 2.3070E+01 | −1.8474E+01 | 8.3524E+00 | −1.6298E+00 |
| S7 | −2.5910E−01 | 6.9437E−01 | −1.2012E+00 | 1.1988E+00 | −8.8660E−01 | 5.0967E−01 | −1.5815E−01 | 0.0000E+00 | 0.0000E+00 |
| S8 | −1.4279E−01 | 3.0050E−01 | −4.0618E−01 | 3.4405E−01 | −1.6791E−01 | 4.1894E−02 | −3.9800E−03 | 0.0000E+00 | 0.0000E+00 |
| S9 | −1.1551E−01 | 1.1379E−01 | −9.3170E−02 | 5.8267E−02 | −2.5030E−02 | 7.0860E−03 | −1.2600E−03 | 1.2700E−04 | −5.5000E−06 |
| S10 | −8.7870E−02 | 5.6329E−02 | −3.2040E−02 | 1.3285E−02 | −3.7300E−03 | 6.6800E−04 | −6.9000E−05 | 3.3000E−06 | −2.5000E−08 |

In embodiment 9, a total effective focal length f of the imaging lens assembly satisfies f=7.08 mm, an effective In view of the above, embodiments 1 to 9 respectively satisfy the relationship shown in Table 19.

TABLE 19

| 条件式\实施例 | 1 | 2 | 3 | 4 | 5 | 6 | 7 | 8 | 9 |
|---|---|---|---|---|---|---|---|---|---|
| HFOV (°) | 16.0 | 16.1 | 16.1 | 16.1 | 16.1 | 16.1 | 16.0 | 16.1 | 16.6 |
| f1/T23 | 3.54 | 4.37 | 3.35 | 4.36 | 4.07 | 3.35 | 3.54 | 3.47 | 4.43 |
| TTL/f | 0.87 | 0.89 | 0.87 | 0.88 | 0.87 | 0.87 | 0.87 | 0.88 | 0.90 |
| f1/CT1 | 2.55 | 1.91 | 2.54 | 2.02 | 2.36 | 2.54 | 2.55 | 2.50 | 2.00 |
| f/T45 | 5.79 | 4.31 | 5.48 | 4.74 | 5.46 | 5.48 | 5.79 | 5.76 | 5.08 |
| f/f3 | 0.82 | 0.74 | 0.62 | 0.61 | 0.60 | 0.62 | 0.82 | 0.76 | 0.60 |
| (f3 − f4)/(f3 + f4) | 2.61 | 7.65 | 1.99 | 2.22 | 2.02 | 1.99 | 2.61 | 2.86 | 2.67 |
| (f1 + f2)/(f1 − f2) | −0.20 | −0.08 | −0.29 | −0.20 | −0.28 | −0.29 | −0.20 | −0.18 | −0.20 |
| (R2 − R3)/(R2 + R3) | 0.05 | 0.08 | 0.09 | 0.12 | 0.20 | 0.09 | 0.05 | 0.05 | 0.11 |
| f1*f3/f (mm) | 3.93 | 3.32 | 5.15 | 4.69 | 5.34 | 5.15 | 3.93 | 4.21 | 4.81 |
| f2*f4/f (mm) | 2.62 | 2.97 | 3.14 | 2.64 | 3.16 | 3.14 | 2.62 | 2.91 | 3.28 |

The present disclosure further provides an imaging apparatus, having a photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An imaging lens assembly comprising: a first lens, a second lens, a third lens, a fourth lens and a fifth lens, which are sequentially arranged from an object side of the imaging lens assembly to an image side of the imaging lens assembly along an optical axis of the imaging lens assembly, wherein,
   the first lens has a positive refractive power, and both of an object-side surface and an image-side surface of the first lens are convex surfaces;
   the second lens has a negative refractive power, and both of an object-side surface and an image-side surface of the second lens are concave surfaces;
   the third lens has a positive refractive power, and an image-side surface of the third lens is a convex surface;
   the fourth lens has a negative refractive power, and an image-side surface of the fourth lens is a concave surface;
   the fifth lens has a positive refractive power or a negative refractive power; and 4.0<f/T45<6.0, 2.5 mm<f2*f4/f<3.5 mm,
   where f is a total effective focal length of the imaging lens assembly, T45 is a spaced distance on the optical axis between the fourth lens and the fifth lens, f2 is an effective focal length of the second lens, and f4 is an effective focal length of the fourth lens.

2. The imaging lens assembly according to claim 1, wherein HFOV≤25°, where HFOV is half of a maximal field-of-view of the imaging lens assembly.

3. The imaging lens assembly according to claim 1, wherein 3.0<f1/T23<5.0,
   where f1 is an effective focal length of the first lens and T23 is a spaced distance on the optical axis between the second lens and the third lens.

4. The imaging lens assembly according to claim 1, wherein TTL/f≤1.0,
   where TTL is a distance on the optical axis from a center of the object-side surface of the first lens to an image plane of the imaging lens assembly and f is the total effective focal length of the imaging lens assembly.

5. The imaging lens assembly according to claim 1, wherein 1.5<f1/CT1<3.0,
   where f1 is an effective focal length of the first lens and CT1 is a center thickness of the first lens on the optical axis.

6. The imaging lens assembly according to claim 1, wherein 0<f/f3<1,
   where f is the total effective focal length of the imaging lens assembly and f3 is an effective focal length of the third lens.

7. The imaging lens assembly according to claim 1, wherein 1.5<(f3−f4)/(f3+f4)<8,
   where f3 is an effective focal length of the third lens and f4 is the effective focal length of the fourth lens.

8. The imaging lens assembly according to claim 1, wherein −0.3≤(f1+f2)/(f1−f2)<0,
   where f1 is an effective focal length of the first lens and f2 is the effective focal length of the second lens.

9. The imaging lens assembly according to claim 1, wherein 0<(R2−R3)/(R2+R3)≤0.20,
   where R2 is a radius of curvature of the image-side surface of the first lens and R3 is a radius of curvature of the object-side surface of the second lens.

10. The imaging lens assembly according to claim 1, wherein 3.0 mm<f1*f3/f<5.5 mm,
    where f1 is an effective focal length of the first lens, f3 is an effective focal length of the third lens and f is the total effective focal length of the imaging lens assembly.

11. An imaging lens assembly comprising: a first lens, a second lens, a third lens, a fourth lens and a fifth lens, which are sequentially arranged from an object side of the imaging lens assembly to an image side of the imaging lens assembly along an optical axis of the imaging lens assembly, wherein,
    the first lens has a positive refractive power, and both of an object-side surface and an image-side surface of the first lens are convex surfaces;
    the second lens has a negative refractive power, and both of an object-side surface and an image-side surface of the second lens are concave surfaces;

the third lens has a positive refractive power, and an image-side surface of the third lens is a convex surface;

the fourth lens has a negative refractive power, and an image-side surface of the fourth lens is a concave surface;

the fifth lens has a positive refractive power or a negative refractive power; and 3.0 mm<f1*f3/f<5.5 mm, 2.5 mm<f2*f4/f<3.5 mm, 3.0<f1/T23<5.0, where f1 is an effective focal length of the first lens, f3 is an effective focal length of the third lens, f is the total effective focal length of the imaging lens assembly, f2 is an effective focal length of the second lens, f4 is an effective focal length of the fourth lens, and T23 is a spaced distance on the optical axis between the second lens and the third lens.

12. The imaging lens assembly according to claim 11, wherein TTL/f≤1.0, where TTL is a distance on the optical axis from a center of the object-side surface of the first lens to an image plane of the imaging lens assembly and f is the total effective focal length of the imaging lens assembly.

13. The imaging lens assembly according to claim 11, wherein −0.3≤(f1+f2)/(f1−f2)<0, where f1 is the effective focal length of the first lens and f2 is the effective focal length of the second lens.

14. The imaging lens assembly according to claim 11, wherein 1.5<(f3−f4)/(f3+f4)<8, where f3 is the effective focal length of the third lens and f4 is the effective focal length of the fourth lens.

15. The imaging lens assembly according to claim 11, wherein 0<f/f3<1, where f is the total effective focal length of the imaging lens assembly and f3 is the effective focal length of the third lens.

16. The imaging lens assembly according to claim 11, wherein HFOV≤25°, where HFOV is half of a maximal field-of-view of the imaging lens assembly.

17. The imaging lens assembly according to claim 11, wherein 1.5<f1/CT1<3.0, where f1 is the effective focal length of the first lens and CT1 is a center distance of the first lens on the optical axis.

18. The imaging lens assembly according to claim 12, wherein 4.0<f/T45<6.0, where f is the total effective focal length of the imaging lens assembly and T45 is a spaced distance on the optical axis between the fourth lens and the fifth lens.

19. The imaging lens assembly according to claim 11, wherein 0<(R2−R3)/(R2+R3)≤0.20, where R2 is a radius of curvature of the image-side surface of the first lens and R3 is a radius of curvature of the object-side surface of the second lens.

* * * * *